US012809819B2

(12) United States Patent
Gole et al.

(10) Patent No.: US 12,809,819 B2
(45) Date of Patent: Nov. 24, 2026

(54) EXECUTING OPERATIONS CORRESPONDING TO TARGET ENTITIES ASSOCIATED WITH FILE SYSTEMS

(71) Applicant: Oracle International Corporation, Redwood Shores, CA (US)

(72) Inventors: Abhijeet Prakash Gole, Cupertino, CA (US); Daniel J. N. Picken, Sunnyvale, CA (US); Gaurav Sharma, San Jose, CA (US); Ravi Lingappa Shamanna, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/092,140

(22) Filed: Mar. 27, 2025

(65) Prior Publication Data

US 2026/0300227 A1 Oct. 1, 2026

(51) Int. Cl.
*G06F 16/00* (2019.01)
*G06F 16/16* (2019.01)
*G06F 16/22* (2019.01)

(52) U.S. Cl.
CPC ........ *G06F 16/164* (2019.01); *G06F 16/2246* (2019.01)

(58) Field of Classification Search
None
See application file for complete search history.

(56) References Cited

U.S. PATENT DOCUMENTS 5,617,566 A 4/1997 Malcolm
7,383,286 B2 6/2008 Hamanaka et al.
7,590,803 B2 9/2009 Wintergerst
8,965,862 B2 2/2015 Allred et al.
9,886,443 B1 2/2018 Gupta et al.
10,067,941 B2 9/2018 Buban et al.
(Continued)

FOREIGN PATENT DOCUMENTS

CN 1605989 A * 4/2005
CN 108153804 A * 6/2018
(Continued)

OTHER PUBLICATIONS

"Anyc/sparse-fio," Github, Retrieved from https://github.com/anyc/sparse-fio, Retrieved on Apr. 16, 2025, 4 pages.
(Continued)

*Primary Examiner* — Bai D Vu
(74) *Attorney, Agent, or Firm* — Invoke

(57) ABSTRACT

A system receives a request from an application for a file system to execute a target operation corresponding to a target entity. In response to receiving the request to execute the target operation, the file system executes a logging operation that includes writing metadata to a log entry of a data structure stored in the one or more persistent storage media. The system determines that execution of the logging operation is complete and transmits, to the application, a response to the request that is based on completion of the logging operation. The logging operation is different than the target operation requested by the application via the request. After transmitting the response to the application, the file system completes execution of the target operation.

23 Claims, 18 Drawing Sheets

(56) References Cited

U.S. PATENT DOCUMENTS

| | | | | |
|---|---|---|---|---|
| 10,108,624 | B1 | 10/2018 | Vermeulen et al. | |
| 10,884,871 | B2 | 1/2021 | Mark | |
| 11,010,361 | B1 | 5/2021 | Chheda et al. | |
| 11,675,772 | B2 | 6/2023 | Zhang et al. | |
| 2003/0009484 | A1 | 1/2003 | Hamanaka et al. | |
| 2003/0105978 | A1 | 6/2003 | Byrne | |
| 2005/0149525 | A1 | 7/2005 | Verma et al. | |
| 2014/0215127 | A1* | 7/2014 | Perrin ................ | G06F 16/2358 711/114 |
| 2015/0012571 | A1 | 1/2015 | Powell et al. | |
| 2016/0110380 | A1 | 4/2016 | Powell et al. | |
| 2020/0192713 | A1 | 6/2020 | Wang et al. | |
| 2021/0224187 | A1 | 7/2021 | Um | |
| 2022/0326847 | A1 | 10/2022 | Otto et al. | |
| 2023/0147552 | A1 | 5/2023 | Mainali et al. | |
| 2025/0117363 | A1 | 4/2025 | Cao et al. | |

FOREIGN PATENT DOCUMENTS

| | | | |
|---|---|---|---|
| CN | 115437550 | A * | 12/2022 |
| WO | 2025/059473 | A1 | 3/2025 |

OTHER PUBLICATIONS

“Class KafkaProducer<K,V>,” Kafka, Retrieved from https://kafka.apache.org/32/javadoc/org/apache/kafka/clients/producer/KafkaProducer.html#send(org.apache.kafka.clients.producer.ProducerRecord), Retrieved on Apr. 16, 2025, 12 pages.

“How to read from a specific offset and partition withthe Apache Kafka® console consumer”, 2 Pages (Date not available).

“Iseek(2)—Linux manual page,” Linux, Retrieved from https://man7.org/linux/man-pages/man2/lseek.2.html, Retrieved on Apr. 16, 2025, 4 pages.

“NTFS Sparse Files For Programmers,” Flexhex, Retrieved from https://web.archive.org/web/20060222050807/http:/www.flexhex.com/docs/articles/sparse-files.phtml, Retrieved on Apr. 16, 2025, 4 pages.

“Paging Through Results Using Offset and Limit,” SMARTBEAR, Retrieved from https://support.smartbear.com/qacomplete/docs/developer/api/rest/api/reference/paging.html, Retrieved on Aug. 6, 2024, 1 page.

“Seek_Hole and Seek_Data: efficiently archive/copy large sparse files,” SysTutorials, Retrieved from https://www.systutorials.com/how-to-efficiently-archive-a-very-large-sparse-file/, Mar. 24, 2018, 9 pages.

“Seek_Hole or Fiemap?,” LWN.net, Retrieved from https://lwn.net/Articles/260795/, Dec. 3, 2007, 5 pages.

“Sparse File Operations,” Microsoft, Retrieved from https://learn.microsoft.com/en-us/windows/win32/fileio/sparse-file-operations, Jan. 27, 2022, 2 pages.

“Sparse file,” archlinux, Retrieved from https://wiki.archlinux.org/title/Sparse_file, Retrieved on Apr. 16, 2025, 6 pages.

“Sparse file,” Wikipedia, Retrieved from https://web.archive.org/web/20250322153506/https:/en.wikipedia.org/wiki/Sparse_file, Retrieved on Apr. 16, 2025, 4 pages.

“XFS,” Wikipedia, Retrieved from https://web.archive.org/web/20250329182834/https:/en.wikipedia.org/wiki/XFS, Retrieved on Apr. 16, 2025, 10 pages.

Gökmen. B., “How to Read a Message From a Specific Offset in Kafka,” Baeldung, Retrieved from https://www.baeldung.com/kafka-read-message-specified-offset, Aug. 29, 2024, 6 pages.

“Priority-HTTP”, Retrieved from https://developer.mozilla.org/en-US/docs/Web/HTTP/Reference/Headers/Priority, Retrieved on Dec. 10, 2024, pp. 1-4.

“Set the Maximum Size of the Error Log File”, Retrieved from https://techdocs.broadcom.com/US/en/ca-enterprise-software/intelligent-automation/ca-workload-automation-de/12-2/maintaining/managing-server-logs/set-the-maximum-size-of-the-error-log-file.html, May 9, 2024, pp. 1-2.

“Transaction log gets full while inserting records”, Retrieved from https://www.sqlservercentral.com/forums/topic/transaction-log-gets-full-while-inserting-records, Retrieved on Mar. 31, 2025, pp. 1-8.

Alhadi, “I/O Prioritization in Windows OS”, Nov. 19, 2020, 24 Pages.

Mao et al., “Improving the SSD Performance by Exploiting Request Characteristics and Internal Parallelism”, IEEE Transactions on Computer-Aided Design of Integrated Circuits and Systems, vol. 37, No. 2, Feb. 2018, pp. 472-484.

Oku et al., “Extensible Prioritization Scheme for HTTP”, Internet Engineering Task Force, Jun. 2022, 22 Pages.

* cited by examiner

EXECUTING OPERATIONS CORRESPONDING TO TARGET ENTITIES ASSOCIATED WITH FILE SYSTEMS

TECHNICAL FIELD

The present disclosure relates to file systems. More particularly, the present disclosure relates to executing operations corresponding to target entities associated with file systems.

BACKGROUND

An application interacts with a file system by issuing requests for various operations, such as creating, reading, writing, or deleting files. The application directs requests to the file system through system calls via application programming interfaces (APIs) that serve as an interface between the application and the file system. When the file system receives a request from the application to perform an operation, the file system performs the operation by translating the operation into tasks that the file system performs to complete the operation. These tasks may include allocating space a storage medium, reading or modifying data blocks of the storage medium, and updating metadata associated with the operation. After the file system completes the operation, the file system returns a response to the application. The response may include a status or result of the operation that indicates whether or not the operation was successfully completed. Additionally, the response may include data requested by the application, for example, in the case of a read operation. When the application directs a request to the file system, the application may pause or wait until the file system completes the operation. The application resumes execution after the file system returns a response to the application, for example, with a status indication and/or with data corresponding to the request from the application.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and refer to at least one embodiment. In the drawings.

DETAILED DESCRIPTION

Figure 1:
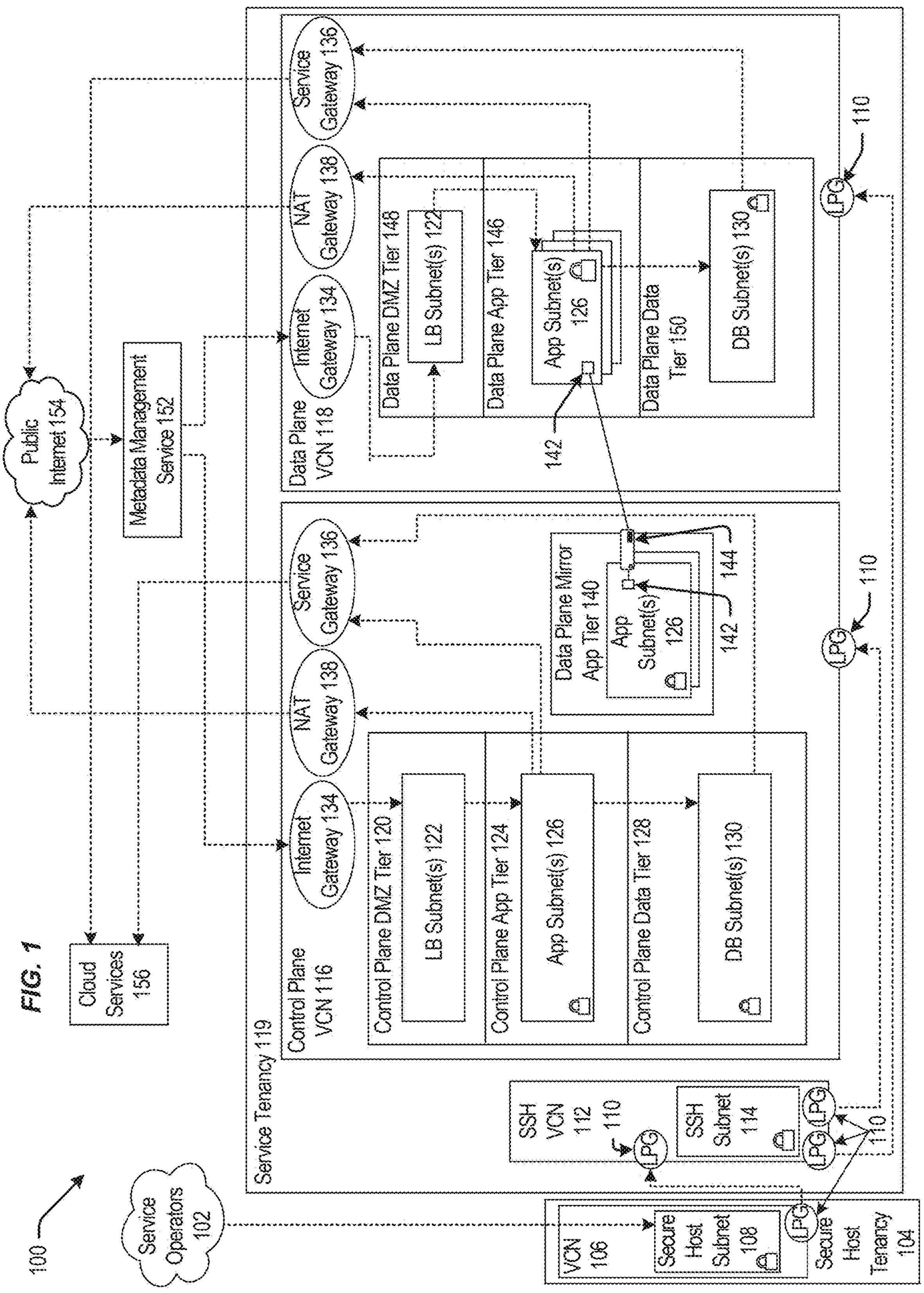
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM
4. SYSTEM ARCHITECTURE FOR EXECUTING OPERATIONS ASSOCIATED WITH A FILE SYSTEM
5. EXAMPLE OPERATIONS ASSOCIATED WITH A FILE SYSTEM
6. MISCELLANEOUS; EXTENSIONS

1. General Overview

One or more embodiments include a file system that indicates that a target operation is complete based on the file system having stored metadata for subsequently executing the target operation. Initially, the file system receives a request from an application for execution of a target operation. The file system then stores metadata, in persistent storage media, that may be used for subsequent executing the target operation. The file system transmits a response to the application indicating that the target operation is complete based on storage of the metadata in the persistent storage media rather than the actual execution of the target operation in the persistent storage media. The response from the file system that confirms completion may be transmitted to the application before the file system executes the target operation in the persistent storage media. The file system executes the target operation in transient storage media for immediate access by the file system. Later, the file system persists the target operation from the transient storage media to the persistent storage media, for example, in a background process. Additionally, or alternatively, by storing the metadata for executing the target operation in the persistent storage media, the file system can execute the target operation based on the metadata, for example, in the event of a file system outage prior to persisting the target operation from the transient storage media to the persistent storage media. Because the file system transmits the response to the application based on execution of the file system operation in the transient storage media, before persisting the target operation to the persistent storage media, the application can execute application operations based on the transient storage media that depend on successful execution of the target operation before the file system persists the target operation to the persistent storage media. In one example, the time for the file system to store the metadata for executing the operation is shorter than the time for the file system to execute the target operation and persist the target operation to persistent storage media. As a result, the application avoids latency associated with waiting for the file system to execute and persist the target operation to persistent storage media while also ensuring that the metadata for execution the target operation is preserved in the event of a file system outage.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on the VMs, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how components interact) can be defined by one or more configuration files. Thus, the overall topology of the infrastructure (e.g., what resources depend on one another and how resources work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users, 'or other customers,' resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
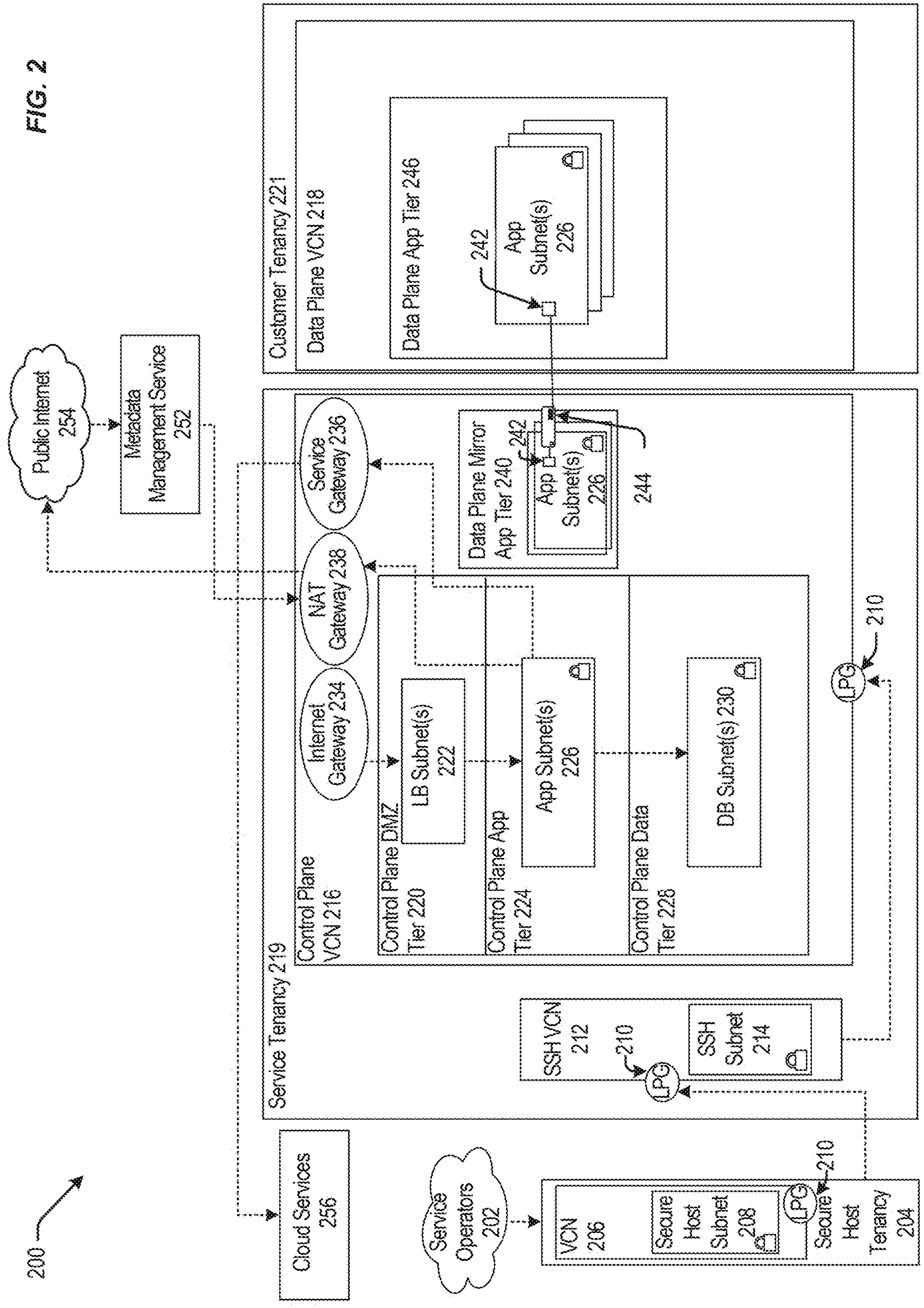

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 per customer, and the IaaS provider may, for the customer, set up a unique, compute instance 244 that is contained in the service tenancy 219. Compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
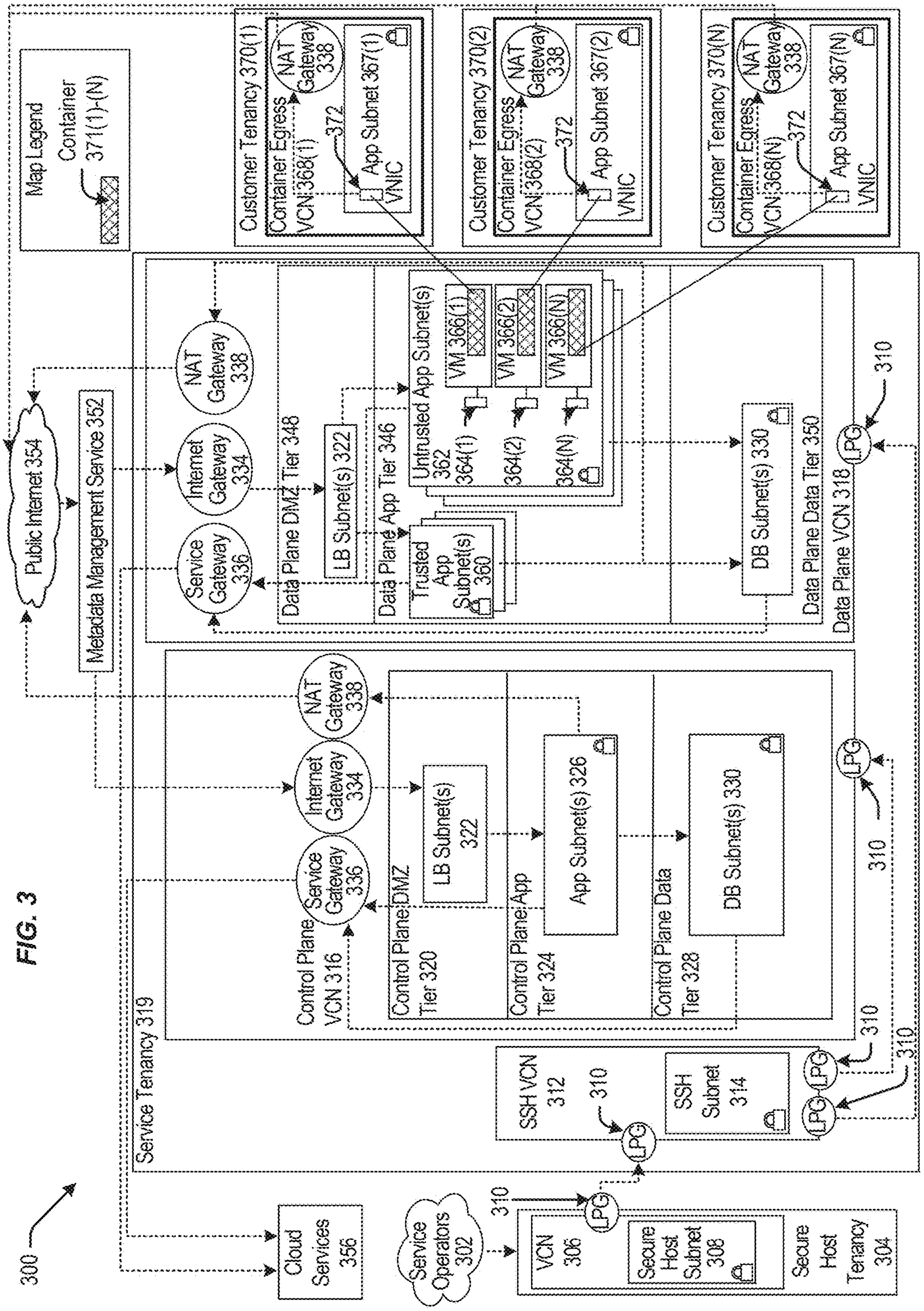

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Tenant(s) VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of the customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
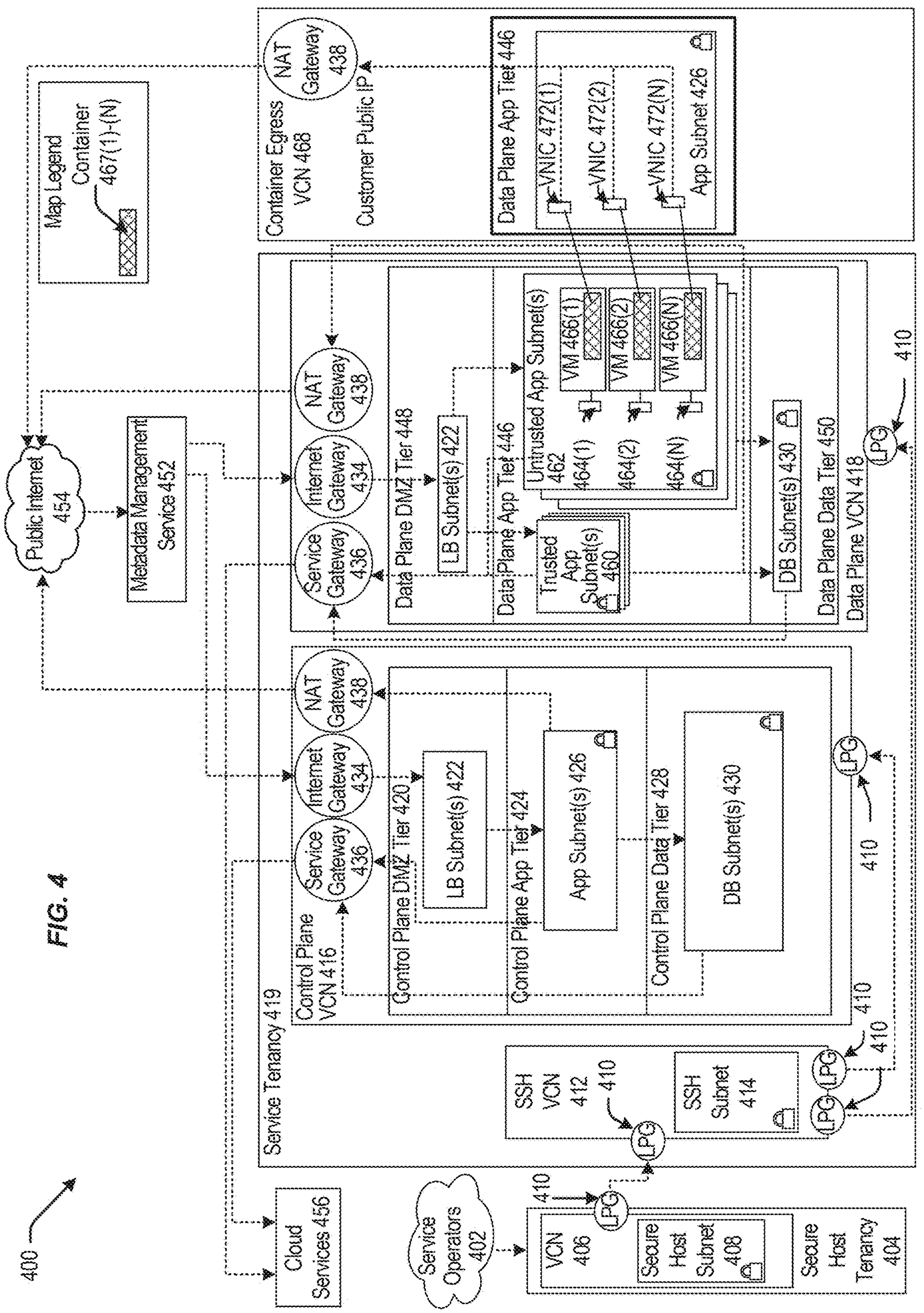

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for customers can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from one other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. A node in an overlay network corresponds to a respective node in the underlying network. Hence, a node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an API.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of one another. Network resources are dynamically assigned to the requests and/or clients on an on-demand basis. Network resources assigned to a request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from one another (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on one other. A call from an application at the private cloud to an application at the public cloud (and vice versa) may be executed through the interface.

In an embodiment, tenants of a multi-tenant computer network are independent of one another. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with other tenants. Various tenant isolation approaches may be used.

In an embodiment, a tenant is associated with a tenant ID. The network resource of the multi-tenant computer network is tagged with a tenant ID. A tenant is permitted access to a particular network resource when the tenant and the particular network resources are associated with a same tenant ID.

In an embodiment, a tenant is associated with a tenant ID. An application, implemented by the computer network, is tagged with a tenant ID. Additionally, or alternatively, data structures and/or datasets, stored by the computer network, are tagged with a tenant ID. A tenant is permitted access to a particular application, data structure, and/or dataset when the tenant and the particular application, data structure, and/or dataset are associated with a same tenant ID.

As an example, a database implemented by a multi-tenant computer network may be tagged with a tenant ID. A tenant associated with the corresponding tenant ID may access data of a particular database. As another example, an entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for a particular tenant, a set of applications that the particular tenant is authorized to access. For a particular application, a list of tenant IDs of tenants authorized to access the particular application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
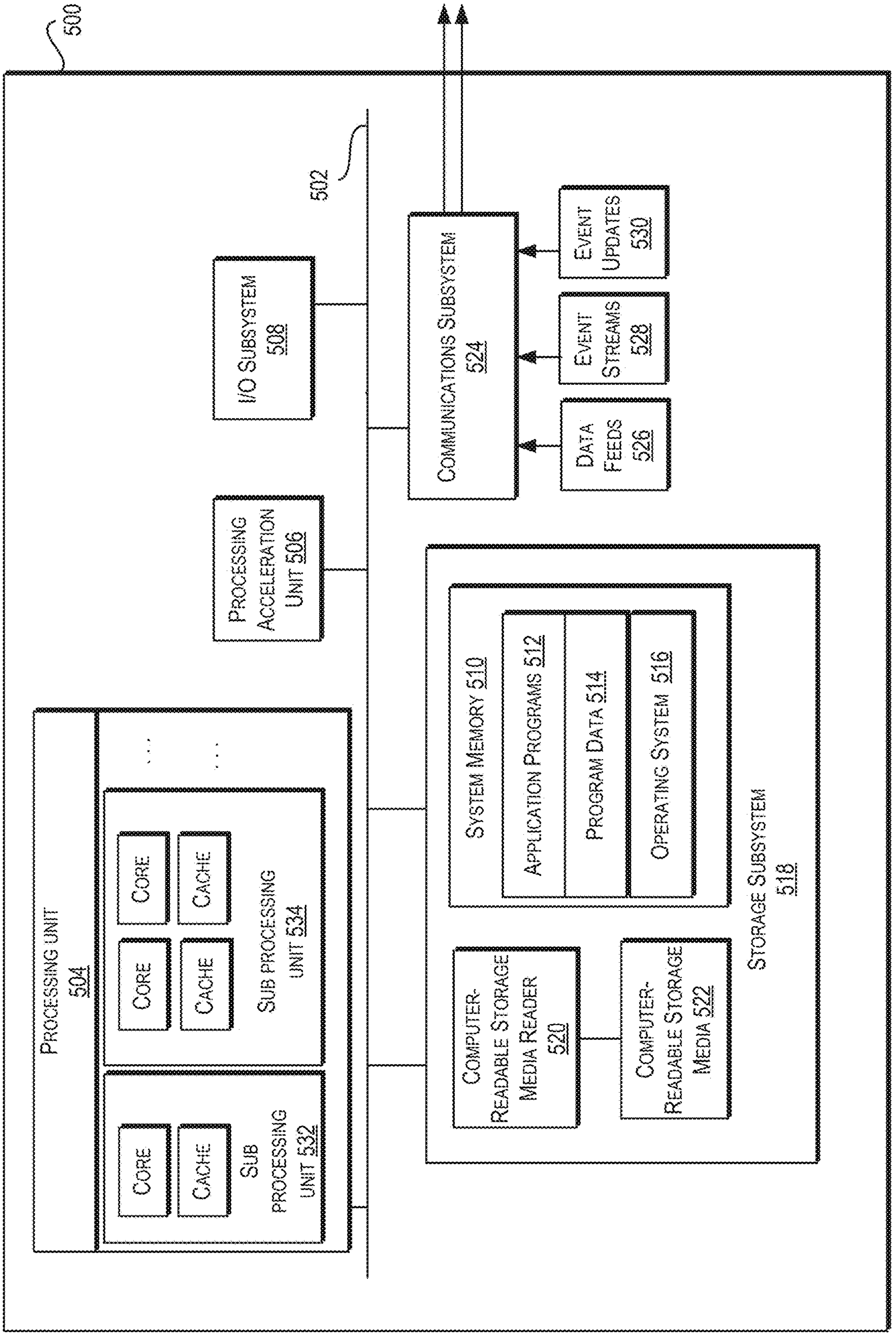
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with one another as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in the processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics, and audio/video information, such as monitors, printers, speakers, headphones, automotive navigation systems, plotters, voice output devices, and modems.

Computer system 500 may comprise a storage subsystem 518 that provides a tangible non-transitory computer-readable media for storing software and data constructs that provide the functionality of the embodiments described in this disclosure. The non-transitory computer-readable media includes instructions that cause performance of operations described herein. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random-access memory (RAM)) and/or non-volatile memory (such as read-only memory (ROM), flash memory, etc.). Different types of RAM configurations may be provided, including a static random-access memory (SRAM), a dynamic random-access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. System Architecture for Executing Operations Associated with a File System

Figure 6A:
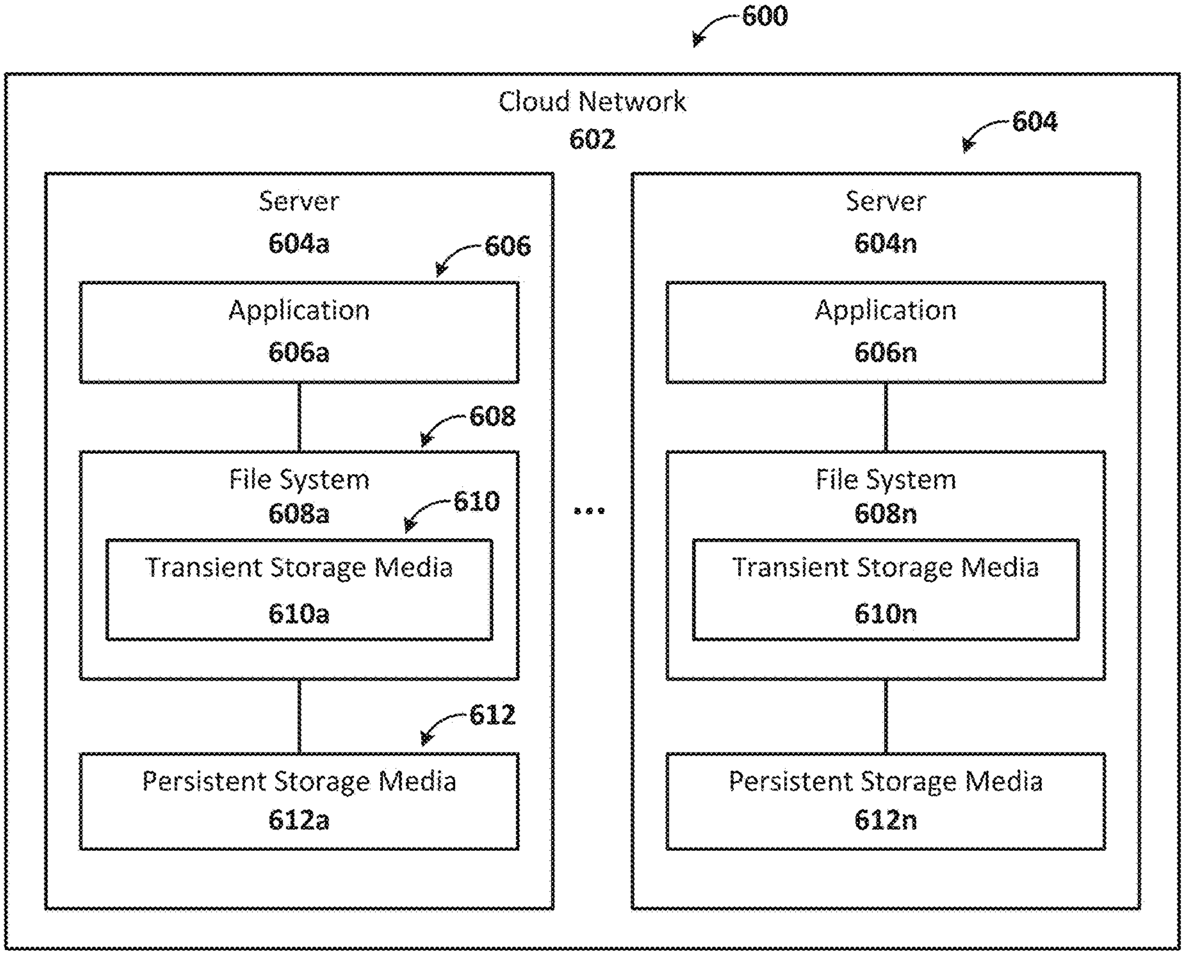
FIGS. 6A and 6B illustrate features of an example system for executing operations associated with a file system in accordance with one or more embodiments.
Figure 6B:
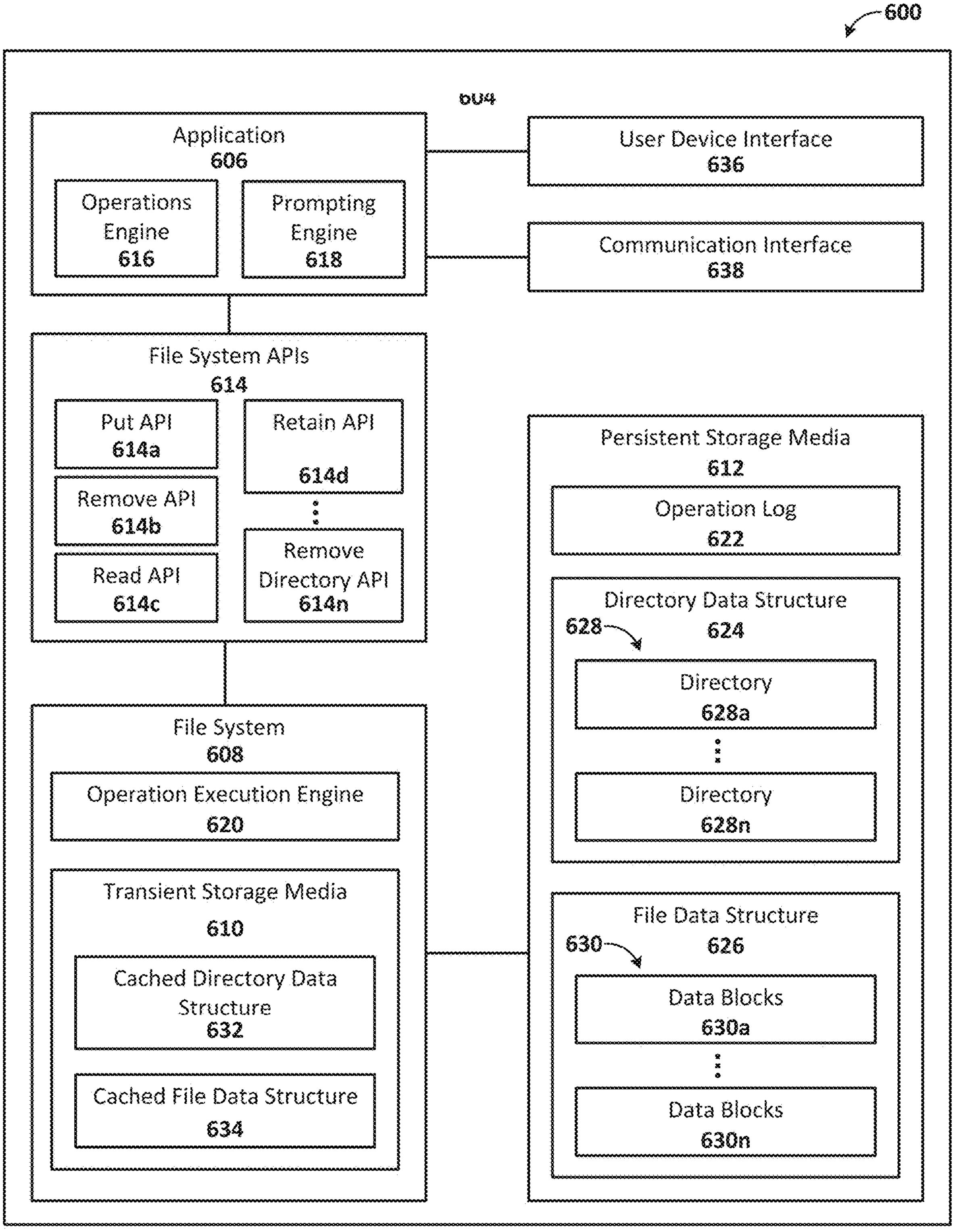

FIGS. 6A and 6B illustrate features of an example system 600 for executing operations associated with a file system in accordance with one or more embodiments. In one or more embodiments, the system 600 refers to hardware and/or software configured to perform operations described herein. Examples of operations are described below with reference to FIGS. 8A-8E. In one example, the system described with reference to FIGS. 6A and 6B may include one or more features described above in Section 2, titled "Cloud Computing Technology," and/or in Section 3, titled "Computer System."

In one or more embodiments, the system 600 may include more or fewer components than the components described with reference to FIGS. 6A and 6B. The components described with reference to FIGS. 6A and 6B may be local to or remote from each other. The components described with reference to FIGS. 6A and 6B may be implemented in software and/or hardware. The components of system 600 may be distributed over multiple applications and/or machines. Multiple components may be combined into one application and/or machine. Operations described with respect to one component may instead be performed by another component.

A. Example Distributed Computing System Systems

As shown in FIG. 6A, the system 600 includes a cloud network 602. The cloud network 602 is a distributed computing system that includes multiple servers 604 that function as independent computing nodes and that collaborate with one another to perform computations or provide services by communicating and coordinating over the network 602. As shown in FIG. 6A, the multiple servers 604 include server 604*a* and server 604*n*. The multiple servers 604 may represent concurrent instances of a computing environment. The multiple servers 604 allow for concurrency, fault tolerance, scalability, and/or resource sharing. The servers 604 include an application 606 and a file system 608, respectively. In one example, as shown in FIG. 6A, server 604*a* includes application 606*a* and file system 608*a*, and server 604*n* includes application 606*n* and file system 608*n*.

Multiple instances of the application 606 represent a distributed application that is distributed across the multiple servers 604. Application 606*a* represents a first distributed application instance and application 606*n* represents a second distributed application instance. A distributed application is a software system in which components run on multiple networked servers 604 and communicate over a network to function as a unified application, enabling scalability, fault tolerance, and resource sharing. In one example, a distributed application incorporates load balancing, redundancy, and/or data replication to enhance performance, availability, and/or resilience, while also leveraging concurrency and asynchronous communication for efficiency. Additionally, multiple instances of the file system 608 represent a distributed file system that is distributed across the multiple servers 604. File system 608*a* represents a first distributed file system instance and file system 608*n* represents a second distributed file system instance. A distributed file system is a storage system that enables multiple networked servers 604 to access, manage, and share files as if they were stored on a single system, while distributing data across multiple locations for scalability and fault tolerance. In one example, a distributed file system incorporates redundancy to enhance data availability and/or reliability, often through replication or erasure coding. Additional features may include load balancing, access control, and/or caching to optimize performance and security.

As further shown in FIG. 6A, the servers 604 include one or more transient storage media 610 and one or more persistent storage media 612, respectively. In one example, as shown in FIG. 6A, server 604*a* includes transient storage media 610*a* and persistent storage media 612*a*, and server 604*n* includes transient storage media 610*n* and persistent storage media 612*n*. The term "transient storage media" refers to storage devices or systems that rely on continuous provision of electrical power to maintain data. Transient storage media may also be referred to as "volatile media." As shown in FIG. 6A, the transient storage media 610 may represent a part of the file system 608. Additionally, or alternatively, the transient storage media 610 may represent a part of the server 604 that executes the file system 604. The transient storage media 610 may include random access memory and/or volatile caches that are utilized for temporary storage, buffering, and/or performance optimization. The file system 608 may utilize the transient storage media 610 to manage active file operations, reduce latency, and/or to enable fast access to frequently used data. The term "persistent storage media" refers to storage devices or systems that retain data independent from availability of electrical power. Persistent storage media may also be referred to as "non-volatile media." The persistent storage media 612 may exist independently from the file system 608. The file system 608 may represent an abstraction layer that organizes and interacts with data stored on the persistent storage media 612. The persistent storage media may include read-only memory, hard disk drives, solid-state drives, and flash memory. In one example, persistent storage media 612 may include removable drives, such as removable hard disk drives, removable solid-state drives, and/or removable flash memory.

B. Example File Systems And Related Components

Referring to FIG. 6B, an example server 604 of the system 600 is further described. The server 604 may represent a portion of the cloud network 602 (FIG. 6A). Server 604*a* and/or server 604*n* of FIG. 6A may include one or more features of the server 604 described with reference to FIG. 6B. As shown in FIG. 6B, the server 604 includes an application 606, one or more file system APIs 614, and a file system 608. The one or more file system APIs 614 serve as an intermediary between the application 606 and the file system 608. The file system 608 organizes data as a hierarchy of directories and files. In one example, the file system stores metadata associated with files separately from file contents. The file system 608 executes operations that appear to have atomicity from the perspective of the application 606. The file system 608 includes software that executes operations associated with management of storage media and data stored on the storage media. The operations executed by the file system include storing data on storage media, retrieving data from storage media, modifying data, and deleting data. Additionally, the file system maintains metadata for managing the data stored on the storage media and the operations executed by the file system.

The file system 608 executes operations in response to requests from the application 606. The application 606 includes software that performs specific tasks or operations, and in connection with those specific tasks or operations, directs requests to the file system 608 to execute file system operations, such as storing, retrieving, modifying, or deleting data. The application 606 includes an operations engine 616 that executes specific tasks or operations of the application and a prompting engine 618 that directs requests to the file system 608 for the file system 608 to execute file system operations. The operations engine 616 may execute application operations, such as one or more of the following: data processing, configuration, content generation, content delivery, data synchronization, backup and recovery, data replication, task coordination, file sharing, service discovery, user authentication, fault tolerance, or data recovery. Additionally, or alternatively, the application operations may be associated with one or more of the following: business processes, customer relationships, order processing, real-time analytics, machine learning, artificial intelligence, document management, employee management, communications, or financial services. The prompting engine 618 may direct requests to the file system 608 in connection with application operations executed by the operations engine 616.

In one example, the application 606 executes a workflow that includes a set of application operations executed by the operations engine 616. During execution of the workflow, the application 606 encounters an application operation that involves performance of a file system operation, such as storing, retrieving, modifying, or deleting data. The application operation may depend on successful execution of the file system operation. The application may utilize the prompting engine 618 to direct a request to the file system 608 for the file system 608 to execute one or more file system operations. The application may pause or wait for a response from the file system. The request from the application 606 to the file system 608 may be blocking with respect to at least a portion of the application operations in the workflow. The prompting engine 618 may direct the request to the file system 608 via a blocking call. The blocking call may prevent at least some application operations from proceeding until the application 606 receives a response to the blocking call that satisfies one or more conditions of the blocking call. For example, when a blocking call is waiting for a file system operation, such as storing, retrieving, modifying, or deleting data, the one or more conditions of the blocking call may depend on successful execution of the file system operation.

In one example, the application 606 releases the blocking call when the application receives a response that indicates that the file system operation is successfully completed. Additionally, or alternatively, the application 606 may release the blocking call when the application 606 receives a response that allows the application 606 to depend on successful execution of the file system operation. The application 606 may be unaware, based on the response from the file system 608, whether or not the file system operation has been completed as of the time when the application 606 receives the response. In one example, the file system 608 performs the file system operation after returning the response to the request from the application 606. The file system 608 stores metadata in persistent memory that allows the file system 608 to execute the file system operation at a later time. Because the metadata is stored in persistent memory, the application 606 can depend on successful execution of the file system operation based on the response. When the application 606 receives a response that satisfies one or more conditions of the request, the application 606 resumes execution of the workflow, for example, by releasing the blocking call. Upon resuming execution of the workflow, the application 606 executes additional application operations. In one example, the application operations executed after the response from the file system 608 depend on a result of the file system operation corresponding to the response that satisfied the one or more conditions for the application 606 to resume execution of the workflow, for example, by releasing the blocking call.

The file system APIs 614 allow the application 606 to direct requests to the file system 608. The server 604 exposes the file system APIs 614 to the application 606, for example, through system libraries and/or through a runtime environment. The file system APIs 614 allow the application 606 to interact with the file system 608. The application 606 may access the file system APIs 614 through function calls for requesting the file system 608 to execute target operations, such as storing, retrieving, modifying, or deleting data. In one example, the server 604 translates the calls from the application 606 sent via the file system APIs 614 into specific instructions that are executable by the file system 608. The file system APIs 614 may include particular APIs for the application 606 to direct requests to the file system 608 for the file system 608 to execute particular target operations and/or combinations of target operations. As shown in FIG. 6B, in one example, the file system APIs 614 include a put API 614*a*, a remove API 614*b*, a read API 614*c*, a retain API 614*d*, and a remove directory API 614*n*.

The put API 614*a* enables the application 606 to direct a request to the file system 608 for the file system 608 to execute one or more target operations associated with an operation type of "put." A put operation may include writing, uploading, and/or inserting data into a data structure stored in one or more storage media. Additionally, or alternatively, a put operation may include modifying data stored in a data structure. The put operation may include writing, uploading, inserting, or modifying data with respect to a target entity, such as a particular file, data structure, or location of a storage media.

Additionally, or alternatively, the put operation may include writing, uploading, inserting, or modifying data associated with one or more directories or subdirectories in a data structure stored in one or more storage media. Additionally, or alternatively, the put operation may include writing, uploading, inserting, or modifying metadata in a data structure stored in one or more storage media. A request generated via the put API 614*a* may include an operation type-identifier that identifies the one or more target operations and a target-identifier that identifies a target entity corresponding to the one or more target operations. In one example, the put API may include data associated with the one or more target operations, such as data to be written, uploaded, or inserted with respect to the target entity and/or data representing a modification to be execute with respect to the target entity.

In one example, a target operation may include executing a put operation with respect to at least a portion of a directory data structure such as an identifier element of the directory data structure. The identifier element may include a key-value pair. The identifier element may include a name of a target entity, such as a name of a file or a name of a data element. The name of the target entity may represent a key of the key-value pair. In one example, the identifier element includes a pointer that points to a location of the target entity, such as a location of the file or data element stored in a persistent storage medium. The pointer may represent a value of the key-value pair. Alternatively, the identifier element may include a data element of the target entity that represents the value of the key-value pair. The put operation may include writing, uploading, inserting, or modifying a key-value pair in a directory data structure.

The file system APIs 614 may include multiple put APIs 614*a* that are associated with different sets of target operations. In one example, the multiple put APIs 614*a* may include a put data API that enables the application 606 to direct a request to the file system 608 for the file system 608 to execute one or more target operations associated with a put operation that includes storing a data element as a value of a key-value pair in a directory data structure. Additionally, or alternatively, the multiple put APIs 614*a* may include a put pointer API that enables the application 606 to direct a request to the file system 608 for the file system 608 to execute one or more target operations associated with a put operation that includes storing a pointer as a value of a key-value pair in a directory data structure that points to a location of a data element in a storage medium. The application 606 may select from among the multiple put APIs 614*a* based on one or more parameters associated with the request being directed to the file system 608. In one example, the application 606 utilizes the put pointer API for data elements that exceed a size threshold. Additionally, or alternatively, the application 606 may utilize the put data API for data elements that are within a size threshold.

The remove API 614*b* enables the application 606 to direct a request to the file system 608 for the file system 608 to execute one or more target operations associated with an operation type of "remove" or "delete." A remove or delete operation may include permanently or temporarily removing data from a data structure stored in one or more storage media. The remove or delete operation may include removing one or more files or a portion of a file, such as a record or entry in a file. Additionally, or alternatively, the remove or delete operation may include removing one or more directories or subdirectories from a data structure stored in one or more storage media. Additionally, or alternatively, the remove or delete operation may include removing or modifying metadata in a data structure stored in one or more storage media. A request generated via the remove API 614*a* may include an operation type-identifier that identifies the one or more target operations and a target-identifier that identifies a target entity corresponding to the one or more target operations.

The read API 614*c* enables the application 606 to direct a request to the file system 608 for the file system 608 to execute one or more target operations associated with an operation type of "read." A read operation may include retrieving data from a data structure stored in one or more storage media. The read operation may include retrieving one or more files or a portion of a file, such as a record or entry in a file. Additionally, or alternatively, the read operation may include retrieving data from one or more directories or subdirectories from a data structure stored in one or more storage media. Additionally, or alternatively, the read operation may include retrieving metadata from a data structure stored in one or more storage media. A request generated via the read API 614*a* may include an operation type-identifier that identifies the one or more target operations and a target-identifier that identifies a target entity corresponding to the one or more target operations.

The retain API 614*d* enables the application 606 to direct a request to the file system 608 for the file system 608 to execute one or more target operations associated with an operation type of "retain." A retain operation may include storing an identifier element associated with a target entity in a retention directory in connection with a remove or delete operation associated with the target entity. The identifier element may include a key-value pair. A key of the key-value pair may include a name of a target entity, such as a name of a file or a name of a data element. A value of the key-value pair may include a pointer that points to a location of the target entity, such as a location of the file or data element stored in a persistent storage medium.

In one example, the retain operation includes storing a first identifier element associated with the target entity in a retention directory and deleting a second identifier element associated with the target entity from an active directory.

The storing of the first identifier element, combined with the deletion of the second identifier element, effectively transfers an identifier element associated with the target entity from the active directory to the retention directory. The file system 608 may reference the identifier element in the retention directory in connection with subsequent operations such as when deleting the target entity from a data structure stored in a persistent storage medium. Example retention directories are further described below with reference to FIGS. 7A and 7B.

The remove directory API 614*n* enables the application 606 to direct a request to the file system 608 for the file system 608 to remove a directory from a directory data structure in connection with one or more target operations associated with an operation type of "remove" or "delete." Example directory data structures and operations associated with removing a directory are further described below with reference to FIGS. 7E and 7F as well as FIGS. 8C and 8D.

Referring further to FIG. 6B, the file system 608 includes an operation execution engine 620. The operation execution engine 620 executes file system operations in response to requests from the application 606. The file system operations may include one or more operations associated with a target operation requested by the application 606, such as storing, retrieving, modifying, or deleting data in one or more storage media. As shown in FIG. 6B, the server 604 includes one or more persistent storage media 612 and one or more transient storage media 610. Multiple data structures may be stored on the one or more persistent storage media 612. As shown in FIG. 6B, the persistent storage media 612 may include one or more of the following data structures: an operation log 622, a directory data structure 624, or a file data structure 626. Example data structures of the persistent storage media 612 are further described below with reference to FIGS. 7A-7F.

The operation log 622 includes log entries that are stored in the operation log 622 when the file system 608 executes logging operations. The logging operations include writing data to log entries stored in the operation log 622 in connection with target operations requested by the application 606. In one example, logging operations include storing data in the persistent storage media 612 and/or in the transient storage media 610 in connection with the log entries stored in the operation log 622. The log entries stored in the operation log 622 may include identifier elements that identify a target operation and a target entity associated with the target operation. In one example, the log entries include a status of the target operation, such as an indication as to whether the target operation is complete or incomplete. The identifier elements stored in the operations log 622 may include a key-value pair. A key of the key-value pair may include a name of the target entity, such as a name of a file or a name of a data element. A value of the key-value pair may include a pointer that points to a location of a file or data element stored in the persistent storage media 612 and/or in the transient storage media 610. Additionally, or alternatively, the value of the key-value pair may include data associated with the target operation, such as data to be written, uploaded, or inserted with respect to the target entity and/or data representing a modification to be executed with respect to the target entity. In one example, the file system 608 stores a log entry in the operation log 622 that includes data associated with the target operation in response to a request from the application provided via the put data API. Additionally, or alternatively, in response to a request from the application 606 provided via the put pointer API, the file system 608 stores (a) data associated with the target operation in the transient storage media 610 and (b) a log entry in the operation log 622 that includes a pointer that points to the data stored in the persistent storage media 612 and/or in the transient storage media 610. At a point in time after executing one or more logging operations, the file system 608 traverses the operation log 622 to execute target operations corresponding to one or more log entries in the operation log 622.

The directory data structure 624 includes one or more directories 629, such as directory 629*a* and directory 629*n*. The directories 629 may include an index that the file system utilizes to access files and/or data elements. The directories 629 may include multiple subdirectories. A directory 629 may include a hierarchical data structure such as a hierarchical tree structure. Example hierarchical data structures include B− trees and B+ trees. B− trees provide a balanced, hierarchical indexing that facilitates efficient search, insertion, and deletion operations, even with large datasets. B+ trees are a variant of a B− tree that stores keys in intermediate nodes and data elements in leaf nodes to facilitate efficient access to the data elements.

The file data structure 626 includes one or more sets of data blocks 630, such as data blocks 630*a* and data blocks 630*n*. The data blocks 630 are units of storage on a storage medium that are utilized to store data elements, such as files or portions of files. The data blocks 630 may have a defined size determined, for example, based on configuration information of the file system 608. Files that are larger than a single data block 630 are distributed across multiple data blocks 630 that may have a contiguous or dispersed location on one or more storage media. The directories 629 may include metadata that is utilized by the file system 608 to track the mapping of data elements or files to corresponding data blocks 630.

The transient storage media 610 includes at least one cached directory data structure 632 and/or at least one cached file data structure 634. A cached directory data structure 632 includes a cached version of a directory data structure 624. A cached file data structure 634 includes a cached version of a file data structure 626. The file system 608 utilizes one or more cached directory data structures 632 and/or one or more cached file data structure 634 to store data elements corresponding to recent target operations. A cached directory data structure 632 may represent an in-memory copy of a directory data structure 624. A cached file data structure 634 may represent an in-memory copy of a file data structure 626. Changes to a cached directory data structure 632 are persisted to a directory data structure 624 corresponding to the cached directory data structure 632, for example, on a periodic basis. Additionally, or alternatively, changes to a cached file data structure 634 are persisted to a file data structure 626 corresponding to the cached file data structure 634, for example, on a periodic basis. In one example, in response to a request from an application 606 to execute a target operation, the file system 608 executes a logging operation and a caching operation. The logging operation includes writing metadata to a log entry of an operation log 622 stored in persistent storage media 612. The caching operation includes executing the target operation in the transient storage media 610. The metadata written to the log entry in the operation log 622 includes sufficient data that the file system 608 to execute the target operation in the persistent storage media 612 corresponding to the log entry. The file system 608 can execute the target operation in the persistent storage media 612 without utilizing or referring to data in the transient storage media 610. In the event of a file system crash where data corresponding to a target operation in the transient storage media 610 is lost or compromised, the file system 608 can execute the target operation in the persistent storage media 612 based on the log entry in the operation log 622 corresponding to the target operation. In one example, in addition to the logging operation and the caching operation, the file system 608 may store a data element in one or more data blocks 630 of the file data structure 626 in persistent storage media 612. The metadata stored in the log entry of the operation log 622 may include a pointer to a location of the data element in the file data structure 626. Later, the file system 608 may update a directory 629 of the directory data structure 624 in the persistent storage media 612 to include a pointer that points to the location of the data element in the file data structure 626. Storing the data element in the one or more data blocks 630 of the file data structure 626 in the persistent storage media 612 may represent a portion of the target operation. Updating the directory 629 of the directory data structure 624 in the persistent storage media 612 may represent an additional portion of the target operation. Completion of the target operation in the persistent storage media 612 may include (a) storing the data element in the one or more data blocks 630 of the file data structure 626 and (b) updating the directory 629 of the directory data structure 624.

In one or more embodiments, the data structures associated with the file system 608 may include any type of storage unit and/or device (e.g., a file system, database, collection of tables, or any other storage mechanism) for storing data. Furthermore, the data structures may include multiple different storage units and/or devices. The multiple different storage units and/or devices may or may not be of the same type or located at the same physical site. Furthermore, a data structure may be implemented or executed on the same computing system as the file system 608 and/or on the same computing system as the application 606. Additionally, or alternatively, a data structure may be implemented or executed on a computing system that is separate from the file system 608 and/or the application 606. The data structures, the file system 608, and/or the application 606 may be communicatively coupled to one another via a direct connection or via a network.

Referring further to FIG. 6B, the server 604 may include a user device interface 636 communicatively coupled or couplable with the application 606 and/or one or more other components of the server 604. A user device interface 636 may include hardware and/or software configured to facilitate interactions between a user and various aspects of the server 604. The user device interface 636 may render user interface elements and receive input via user interface elements. For example, the user device interface 636 may display outputs generated by the application 606. Additionally, or alternatively, the user device interface 636 may be configured to provide inputs to the application 606. Examples of interfaces include a graphical user interface (GUI), a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by a user device interface 636.

In an embodiment, different components of a user device interface 636 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, a user device interface 636 may be specified in one or more other languages, such as Java, C, or C++.

Additionally, or alternatively, the server 604 may include one or more communications interfaces 638 communicatively coupled or couplable with the application 606 and/or one or more other components of the server 604. The one or more communications interfaces 638 may include hardware and/or software configured to transmit data between respective components of the server 604 and/or to transmit data to and/or from the server 604. For example, a communications interface 638 may transmit and/or receive data between and/or among one or more of the following: the application 606, the file system APIs 614, the file system 608, one or more persistent storage media 612, one or more transient storage media 610, and/or one or more user device interfaces 636.

In one example, the server 604 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

C. Example File System Data Structures

Referring to FIGS. 7A-7F, example file system data structures are further described. As shown in FIGS. 7A-7F, one or more persistent storage media 700 include one or more data structures 702 associated with a file system. The persistent storage media 612 described above with reference to FIGS. 6A and 6B may include one or more data structures 702 of the persistent storage media 700 described below with reference to FIGS. 7A-7F. As shown in FIGS. 7A-7F, the one or more persistent storage media 700 includes an operation log 704 and one or more directory data structures 706. Additionally, or alternatively, a cached version of more data structures 702 of the persistent storage media 700 may be stored in transient storage media 610 described above with reference to FIGS. 6A and 6B. The transient storage media 610 may include one or more data structures 702 described below with reference to the persistent storage media 700 of FIGS. 7A-7F. One or more data structures 702 described below with reference to the persistent storage media 700 of FIGS. 7A-7F may be persisted from the transient storage media 610 to the persistent storage media 700. Additionally, or alternatively, one or more data structures 702 described below with reference to FIGS. 7A-7F may be written directly to the persistent storage media 700, for example, without relying on a cached version in the transient storage media 610.

i. Directory Data Structures With Pointers That Point To Data Stored In File Data Structures Referring to FIGS. 7A and 7B, a directory data structure 706 stored in persistent storage media 700 may include a pointer directory structure 708 and a file data structure 710.

The pointer directory structure 708 includes a hierarchical data structure 712, such as a B-tree, that includes pointers that point to data elements or files stored in the file data structure 710. The file data structure 710 includes a set of data blocks 714, such as data blocks 714*a* and data blocks 714*b* that respectively store data elements or files. The pointers of the pointer directory structure 708 point to locations of data blocks 714 in the file data structure 710 where files or data elements corresponding to the pointers are stored. The hierarchical data structure 712 includes a root node 716, a set of intermediate nodes 718, and a set of leaf nodes 720. The root node 716 includes one or more root keys that act as separators for traversing the hierarchical data structure 712 from the root node 716 to an intermediate node 718. In one example, when traversing the hierarchical data structure 712, a search key that is less than a root key of the root node 716 directs the traversal to an intermediate node 718 located to the left, and a search key that is greater than the root key directs the traversal to an intermediate node 718 located to the right. The intermediate nodes 718 include one or more intermediate keys that act as separators for traversing the hierarchical data structure 712 from an intermediate node 718 to a leaf node 720. In one example, when traversing the hierarchical data structure 712, a search key that is less than an intermediate key of the intermediate nodes 718 directs the traversal to a leaf node 720 located to the left, and a search key that is greater than the intermediate key directs the traversal to a leaf node 720 located to the right. In one example, the root node 716 and/or the intermediate nodes 718 may include key-value pairs and/or pointers, for example, in addition, or in the alternative, to keys. The key portion of the key-value pairs may act as separators for traversing the hierarchical data structure 712. The value portion of the key-value pairs may store data elements such as metadata. The pointer portion of a root node 716 and/or intermediate node 718 may point to child nodes. The leaf nodes 720 store identifier elements that include key-value pairs. A key of the key-value pair may include a name of a target entity, such as a name of a file or a name of a data element. In one example, as shown in FIGS. 7A and 7B, a value of the key-value pair may include a pointer that points to a location of the target entity, such as a location of data blocks 714, where the file or data element is stored in the file data structure 710.

Figure 7A:
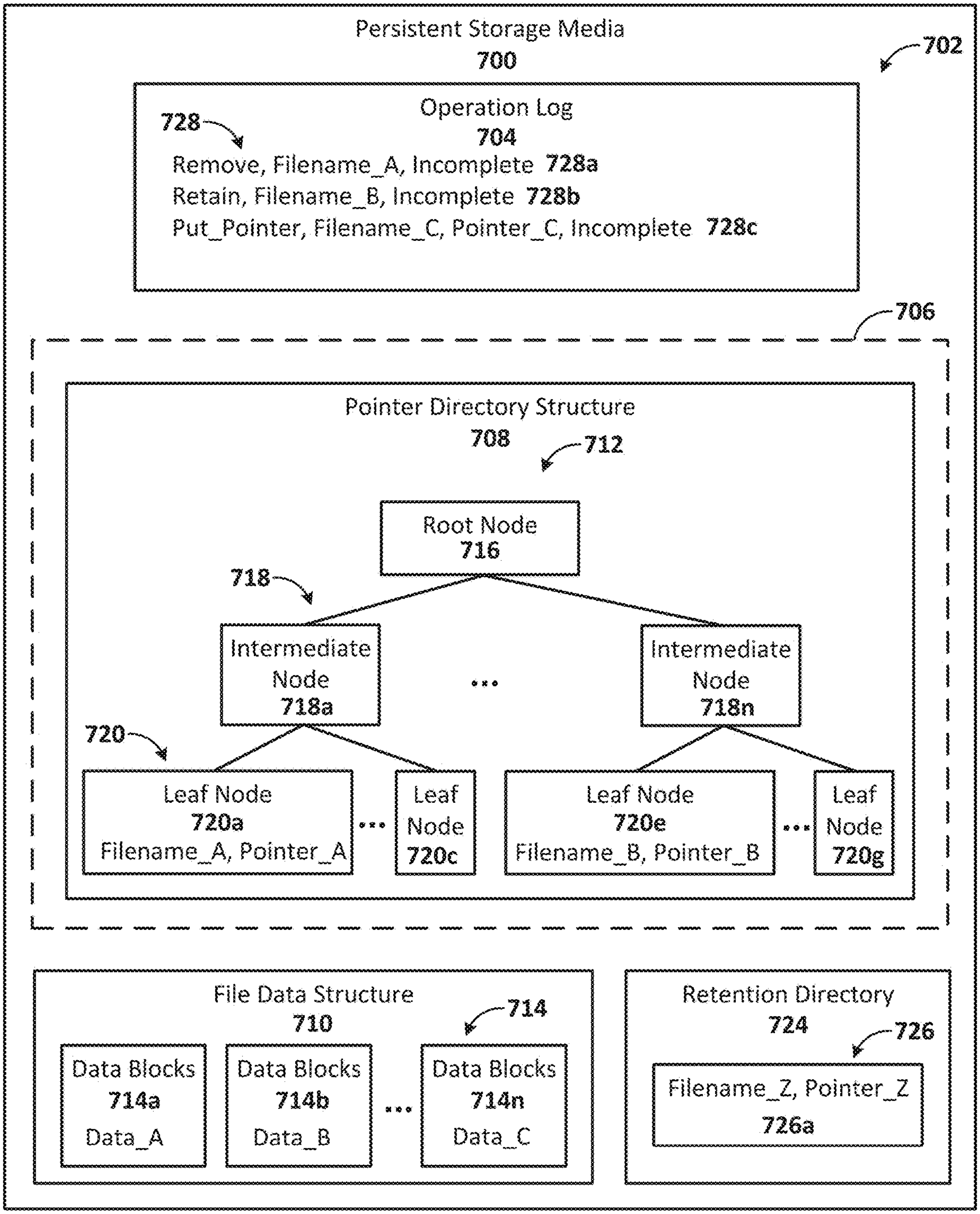
FIGS. 7A-7F schematically depict example file system data structures in accordance with one or more embodiments.
Figure 7B:
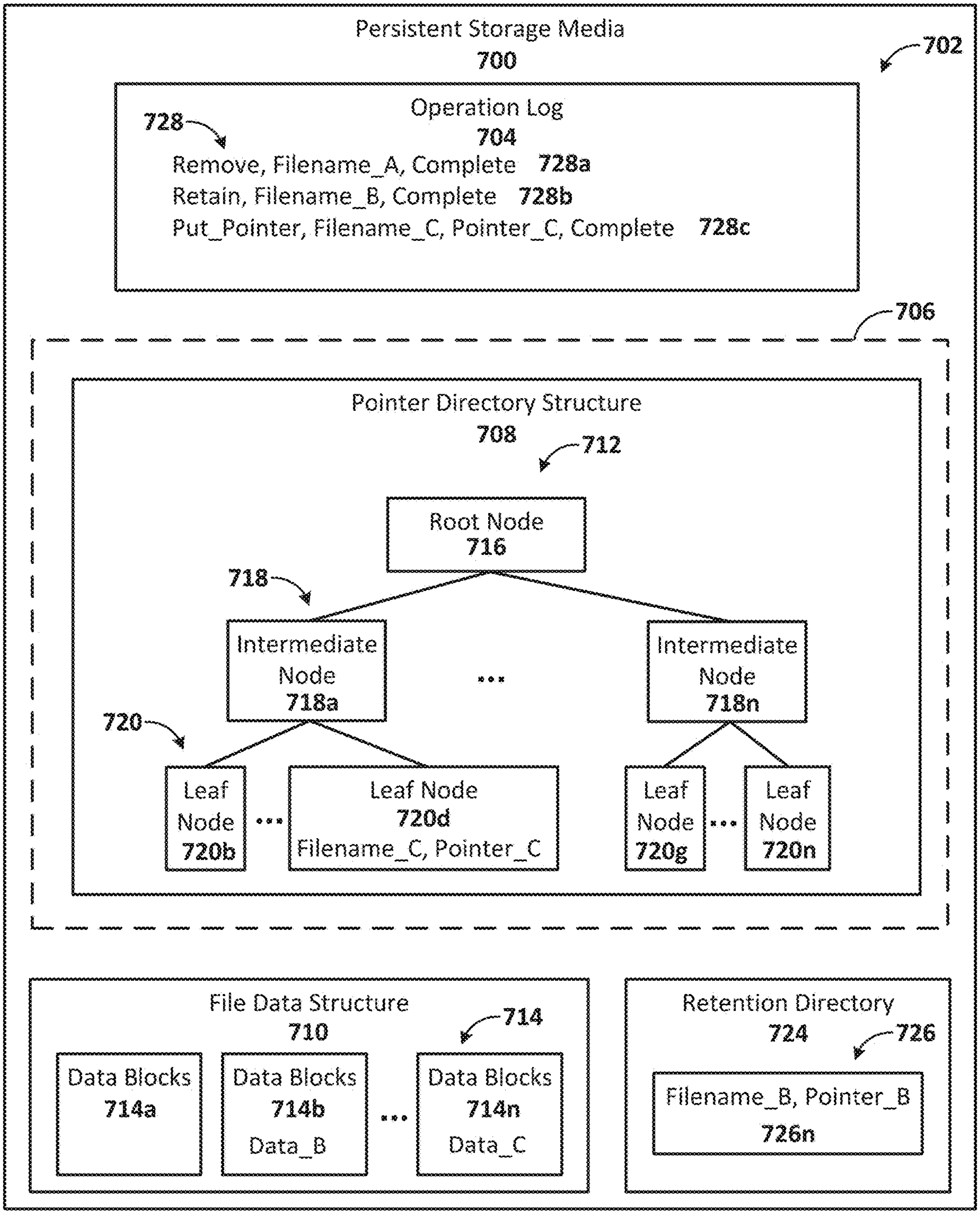

Referring to FIG. 7A, in one example, the pointer directory structure 708 includes root node 716, intermediate node 718*a*, and intermediate node 718*n*. Additionally, the pointer directory structure 708 includes leaf node 720*a* and leaf node 720*c*, corresponding to intermediate node 718*a*, and leaf node 720*e* and leaf node 720*g*, corresponding to intermediate node 718*n*. In one example, leaf node 720*a* includes a key-value pair where the key portion of the key-value pair identifies file "A" (Filename_A) and the value portion of the key-value pair includes a pointer (Pointer_A) that points to data element "A" (Data_A) located in data blocks 714*a* of the file data structure 710. Additionally, leaf node 720*e* includes a key-value pair where the key portion of the key-value pair identifies file "B" (Filename_B) and the value portion of the key-value pair includes a pointer (Pointer_B) that points to data element "B" (Data_B) located in data blocks 714*b* of the file data structure 710.

In one example, the persistent storage media 700 may include a retention directory 724. The retention directory 724 may include a data structure 702 that stores identifier elements 726 that have been removed from a directory data structure 706. The identifier elements 726 stored in the retention directory 724 may include a key-value pair with a key that identifies a file or data element and a value that includes a pointer that points to a location of the file or data element identified by the key. For example, a key-value pair of identifier element 726*a* has a key (Filename_Z) that identifies a file or data element and a value (Pointer_Z) that points to the file or data element identified by the key. Identifier element 726*a* may represent a file or data element that has yet to be removed from the file data structure 710.

As described with reference to FIGS. 7A and 7B, the operation log 704 includes a set of log entries 728, such as log entry 728*a*, log entry 728*b*, and log entry 728*c*. The file system executes logging operations that include writing data to the log entries 728 in the operation log 704. Additionally, the file system executes target operations that include traversing the operation log 704 to identify log entries 728, corresponding to target operations that have a status of "incomplete," and executing one or more additional target operations, corresponding to the log entries 728. As shown in FIG. 7A, log entry 728*a*, log entry 728*b*, and log entry 728*c* have a status of "incomplete," indicating that the file system has yet to complete the one or more target operations, corresponding to those log entries 728.

Log entry 728*a* includes an operation type-identifier (Remove) that serves as an indicator for one or more target operations and a target entity-identifier (Filename_A) that serves as an indicator for one or more target entities, corresponding to the one or more target operations. The file system may utilize the target entity-identifier (Filename_A) of log entry 728*a* to locate an identifier element in the pointer directory structure 708 that corresponds to the log entry 728*a*. Leaf node 720*a* of the pointer directory structure 708 includes an identifier element (Filename_A, Poitner_A), corresponding to log entry 728*a*. The identifier element of leaf node 720*a* includes a key-value pair with a key (Filename_A) that identifies a file or data element and value that includes a pointer (Pointer_A) that points to a location of the file or data element identified by the key. The pointer of the key-value pair points to data blocks 714*a* of the file data structure 710 where the file or data element (Data_A) identified by the key of the key-value pair is stored. The one or more target operations, corresponding to log entry 728*a*, include deleting the file or data element (Data_A) from data blocks 714*a* and deleting leaf node 720*a* to remove the identifier element (Filename_A, Poitner_A), corresponding to the file or data element from the pointer directory structure 708. As shown in FIG. 7B, data blocks 714*a* may be empty after deleting the file or data element (Data_A) from data blocks 714*a*.

Log entry 728*b* includes an operation type-identifier (Retain) that serves as an indicator for one or more target operations. The file system may utilize the target entity-identifier (Filename_B) of log entry 728*b* to locate an identifier element in the pointer directory structure 708 that corresponds to the log entry 728*b*. Leaf node 720*e* of the pointer directory structure 708 includes an identifier element (Filename_B, Poitner_B), corresponding to log entry 728*b*. The identifier element of leaf node 720*b* includes a key-value pair with a key (Filename_B) that identifies a file or data element and value that includes a pointer (Pointer_B) that points to a location of the file or data element identified by the key. The pointer of the key-value pair points to data blocks 714*b* of the file data structure 710 where the file or data element (Data_B) identified by the key of the key-value pair is stored. The one or more target operations, corresponding to log entry 728*b*, include retaining the identifier element in the retention directory 724. The identifier element may be retained in the retention directory 724 for reference, for example, to delete the file or data element (Data_B), corresponding to the identifier element at a subsequent time. In one example, the file system retains the identifier element by storing a new identifier element in the retention directory 724, corresponding to the identifier element being deleted from the pointer directory structure 708.

Log entry 728*c* includes an operation type-identifier (Put_Pointer) that serves as an indicator for one or more target operations and a target entity-identifier (Filename_C) that serves as an indicator for one or more target entities, corresponding to the one or more target operations. A file or data element (Data_C), corresponding to log entry 728*c*, is stored in data blocks 714*n* of the file data structure 710. The log entry 728*c* includes a pointer (Pointer_C) that points to the file or data element (Data_C) in the file data structure 710. In one example, the target entity-identifier (Filename_C) and the pointer (Pointer_C) represent a key and a value, respectively, of a key-value pair. The file system may utilize the pointer (Pointer_C) to locate the file or data element (Data_C) in the file data structure 710, for example, when executing the target operations that correspond to log entry 728*c*. The one or more target operations, corresponding to log entry 728*c*, include storing the file or data element (Data_C) in the file data structure 710 and storing an identifier element (Filename_C, Poitner_C) in the pointer directory structure 708 that identifies the file or data element in the file data structure 710.

FIG. 7B represents an example state of the persistent storage media 700 after executing the one or more target operations corresponding to log entry 728*a*, log entry 728*b*, and log entry 728*c*, respectively. As shown in FIG. 7B, log entry 728*a*, log entry 728*b*, and log entry 728*c* have a status of "complete," indicating that the file system has completed the one or more target operations that correspond to those log entries 728.

The one or more target operations corresponding to log entry 728*a* include deleting leaf node 720*a* (FIG. 7A) from the pointer directory structure 708. Leaf node 720*a* does not appear in FIG. 7B, representing leaf node 720*a* having been deleted from the pointer directory structure 708. Additionally, the one or more target operations that correspond to log entry 728*a* include deleting the file or data element (Data_A) from data blocks 714*a* (FIG. 7A). Data blocks 714*a* does not appear in FIG. 7B, representing (Data_A) having been deleted from data blocks 714*a*.

The one or more target operations, corresponding to log entry 728*b*, include deleting leaf node 720*e* from the pointer directory structure 708 to remove the identifier element, corresponding to log entry 728*b*, and storing a new identifier element 726*n*, corresponding to log entry 728*b*, in the retention directory 724. Leaf node 720*e* does not appear in FIG. 7B, representing leaf node 720*e* having been deleted from the pointer directory structure 708. Additionally, as shown in FIG. 7B, the retention directory 724 includes identifier element 726*n*, corresponding to log entry 728*b*. Identifier element 726*a* (FIG. 7A) does not appear in retention directory 724, representing identifier element 726*a* having been deleted from the retention directory 724. The one or more target operations, corresponding to log entry 728*c*, include storing file or data element (Data_C) in data blocks 714*n* of the file data structure 710 and storing an identifier element (Filename_C, Poitner_C) in leaf node 720*d* of the pointer directory structure 708.

ii. Directory Data Structures With Data Elements Stored In Leaf Nodes

Figure 7C:
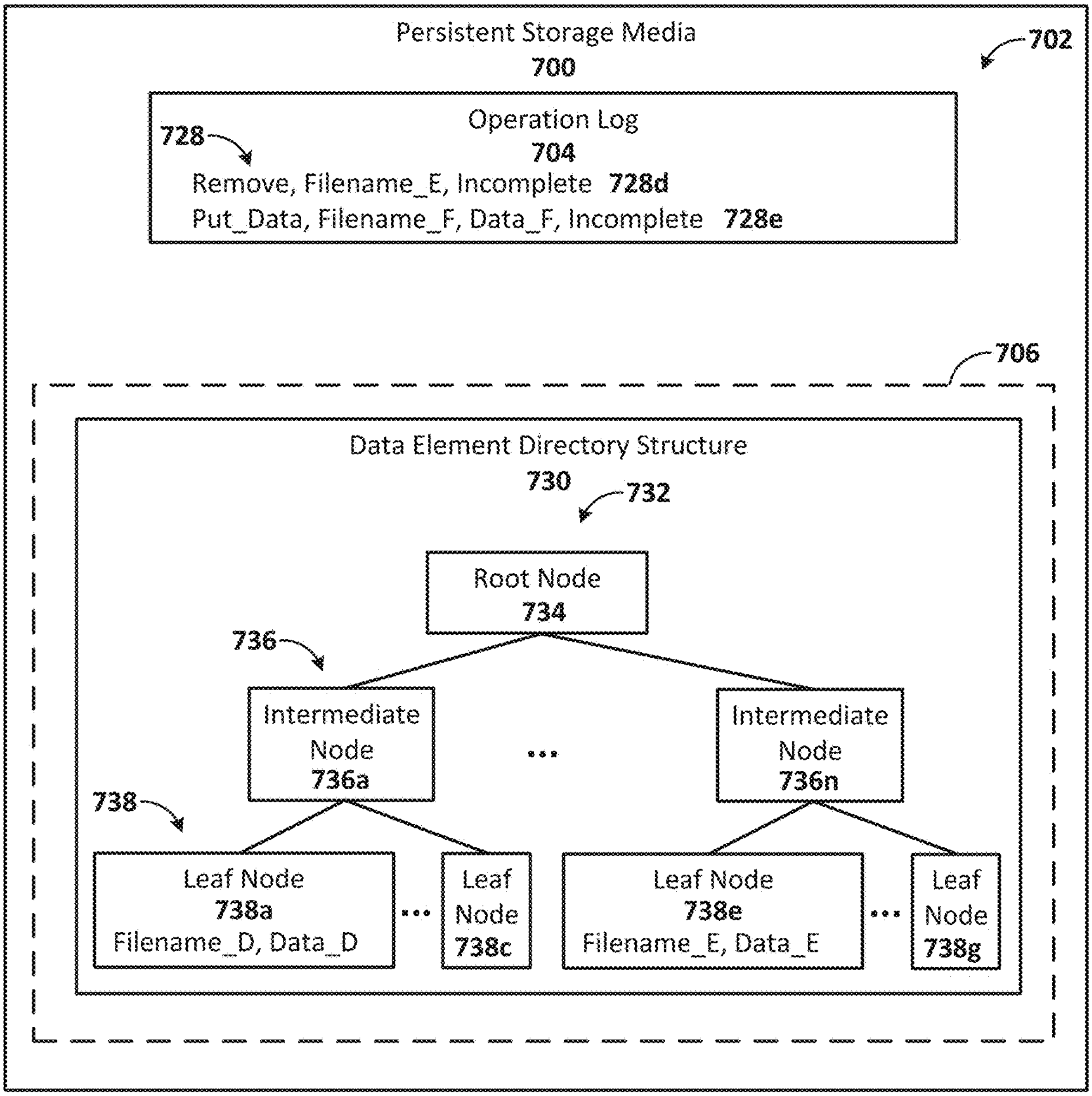
Figure 7D:
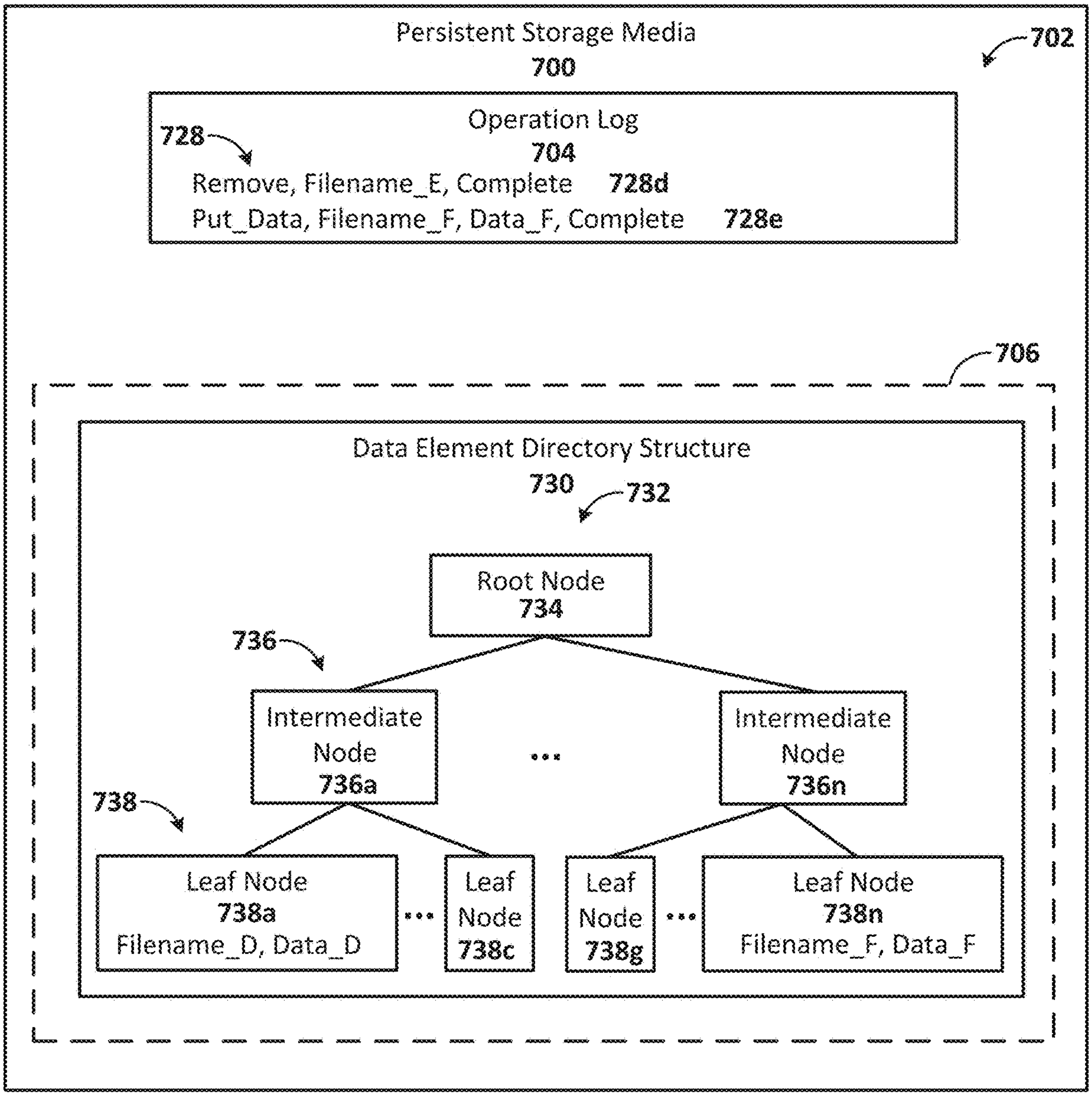

Referring to FIGS. 7C and 7D, example data structures 702 of persistent storage media 700 are further described. As shown in FIGS. 7C and 7D, a directory data structure 706 stored in persistent storage media 700 may include a data element directory structure 730. The data element directory structure 730 includes a hierarchical data structure 732, such as a B+ tree, that includes leaf nodes that store data elements. The data element stored in a leaf nodes of the hierarchical data structure 732 may include a file or a portion of a file. Additionally, or alternatively, the data element stored in a leaf node of the of the hierarchical data structure 732 may include metadata, such as metadata associated with files and/or operations of the filing system. In one example, the persistent storage media 700 includes one or more data element directory structures 730 in addition to one or more pointer directory structures 708 as described with reference to FIGS. 7A and 7B. In one example, a data element directory structure 730 and a pointer directory structure 708 represent a same data structure 702, such as different portions of a same data structure 702 stored in one or more persistent storage media 700. For example, hierarchical data structure 712/732 may include one or more leaf nodes that include pointers, as described with reference to FIGS. 7A and 7B, and one or more leaf nodes that include data elements, as described with reference to FIGS. 7C and 7D. Additionally, or alternatively, a data element directory structure 730 and a pointer directory structure 708 may represent different data structures 702 stored in one or more persistent storage media 700.

As shown in FIGS. 7C and 7D, the hierarchical data structure 732 includes a root node 734, a set of intermediate nodes 736, and a set of leaf nodes 738. The root node 734 includes one or more root keys that act as separators for traversing the hierarchical data structure 732 from the root node 734 to an intermediate node 736. In one example, when traversing the hierarchical data structure 732, a search key that is less than a root key of the root node 734 directs the traversal to an intermediate node 736 located to the left, and a search key that is greater than the root key directs the traversal to an intermediate node 736 located to the right. The intermediate nodes 736 include one or more intermediate keys that act as separators for traversing the hierarchical data structure 732 from an intermediate node 736 to a leaf node 738. In one example, when traversing the hierarchical data structure 732, a search key that is less than an intermediate key of the intermediate nodes 736 directs the traversal to a leaf node 738 located to the left, and a search key that is greater than the intermediate key directs the traversal to a leaf node 738 located to the right. In one example, the root node 734 and/or the intermediate nodes 736 may include key-value pairs and/or pointers, for example, in addition, or in the alternative, to keys. The key portion of the key-value pairs may act as separators for traversing the hierarchical data structure 732. The value portion of the key-value pairs may store data elements such as metadata. The pointer portion of a root node 734 and/or intermediate node 736 may point to child nodes. The leaf nodes 738 store identifier elements that include key-value pairs. A key of the key-value pair may include a name of a target entity, such as a name of a file or a name of a data element. In one example, as shown in FIGS. 7C and 7D, a value of the key-value pair may include a data element, such as a file or a portion of a file.

Referring to FIG. 7C, in one example, the data element directory structure 730 includes root node 734, intermediate node 736*a*, and intermediate node 736*n*. Additionally, the data element directory structure 730 includes leaf node 738*a* and leaf node 738*c*, corresponding to intermediate node 736*a*, and leaf node 738*e* and leaf node 738*g*, corresponding to intermediate node 736*n*. In one example, leaf node 738*a* includes a key-value pair where the key portion of the key-value pair identifies file "D" (Filename_D), and the value portion of the key-value pair includes a data element (Data_D), corresponding to file "D." The data element may include one or more of the following: at least a portion of file "D," metadata associated with file "D," or metadata associated with operations executed with respect to file "D." Additionally, leaf node 738*e* includes a key-value pair where the key portion of the key-value pair identifies file "E" (Filename_E), and the value portion of the key-value pair includes a data element (Data_E), corresponding to file "E." The data element may include one or more of the following: at least a portion of file "E," metadata associated with file "E," or metadata associated with operations executed with respect to file "E."

As shown in FIGS. 7C and 7D, the set of log entries 728 of the operation log 704 includes log entry 728*d* and log entry 728*e*. The logging operations executed by the file system include writing data to the log entries 728 in the operation log 704. The target operations executed by the file system includes traversing the operation log 704 to identify log entries 728, corresponding to target operations that have a status of "incomplete," and executing one or more additional target operations corresponding to the log entries 728. As shown in FIG. 7C, log entry 728*d* and log entry 728*e* have a status of "incomplete," indicating that the file system has yet to complete the one or more target operations corresponding to those log entries 728.

Log entry 728*d* includes an operation type-identifier (Remove) that serves as an indicator for one or more target operations and a target entity-identifier (Filename_E) that serves as an indicator for one or more target entities corresponding to the one or more target operations. The file system may utilize the target entity-identifier (Filename_E) of log entry 728*d* to locate an identifier element in the data element directory structure 730 that corresponds to the log entry 728*d*. Leaf node 738*e* of the data element directory structure 730 includes an identifier element (Filename_E, Data_E), corresponding to log entry 728*d*. The identifier element of leaf node 738*e* includes a key-value pair with a key (Filename_E) that identifies a file or data element and value that includes the file or data element (Data_E) that points to a location of the file or data element identified by the key. The one or more target operations, corresponding to log entry 728*d*, include deleting leaf node 738*a* to remove the file or data element (Data_E) from the data element directory structure 730.

Log entry 728*e* includes an operation type-identifier (Put_Data) that serves as an indicator for one or more target operations and a target entity-identifier (Filename_F) that serves as an indicator for one or more target entities corresponding to the one or more target operations. A file or data element (Data_F), corresponding to log entry 728*e*, is stored in the operation log 704 as part of log entry 728*e*. In one example, the target entity-identifier (Filename_F) and the file or data element (Data_F) represent a key and a value, respectively, of a key-value pair. The one or more target operations, corresponding to log entry 728*e*, include storing the file or data element (Data_F) in the data element directory structure 730. For example, the one or more target operations may include storing an identifier element (Filename_F, Data_F) as a key-value pair in a leaf node 738 of the data element directory structure 730.

FIG. 7D represents an example state of the persistent storage media 700 after executing the one or more target operations corresponding to log entry 728*d* and log entry 728*e*, respectively. As shown in FIG. 7D, log entry 728*d* and log entry 728*e* have a status of "complete," indicating that the file system has completed the one or more target operations corresponding to those log entries 728.

The one or more target operations corresponding to log entry 728*d* include deleting leaf node 738*e* (FIG. 7C) from the data element directory structure 730. Leaf node 738*e* does not appear in FIG. 7D, representing leaf node 738*e* having been deleted from the data element directory structure 730. The one or more target operations corresponding to log entry 728*e* include storing an identifier element (Filename_F, Data_F) as a key-value pair in leaf node 738*n* of the data element directory structure 730. The target entity-identifier (Filename_F) represents the key of the key-value pair, and the file or data element (Data_F) represents the value of the key-value pair.

In one example, in addition or as an alternative to the operation types of "remove" and "put" described with reference to FIGS. 7C and 7D, the file system may execute other operation types with respect to a data element directory structure 730, for example, corresponding to operation type-identifiers in the operation log 704. The other operation types that the file system may execute with respect to a data element directory structure 730 may include "Retain" operations described with reference to FIGS. 7A and 7B.

iii. Removal of Target Directories from Directory Data Structures

Figure 7E:
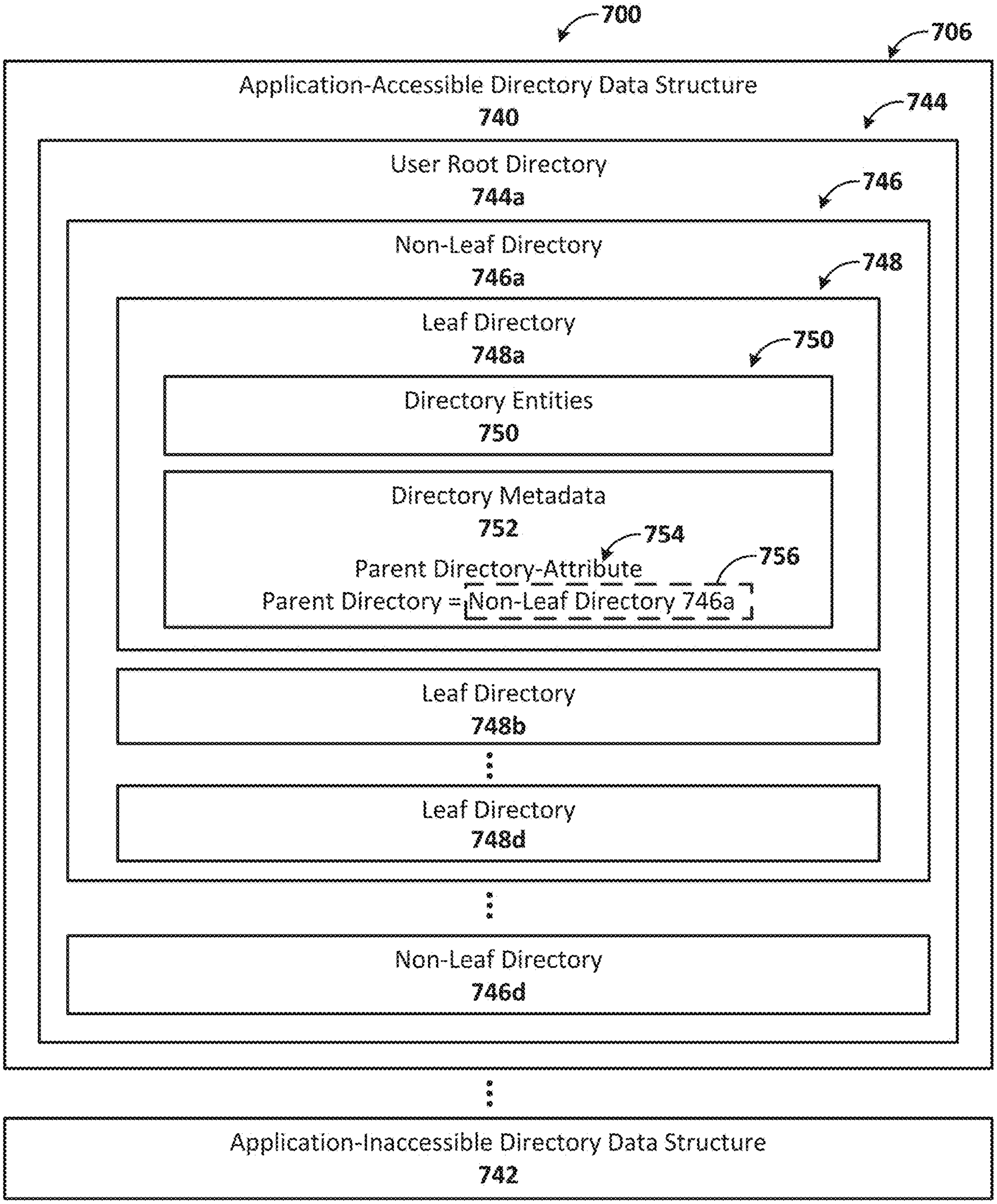
Figure 7F:
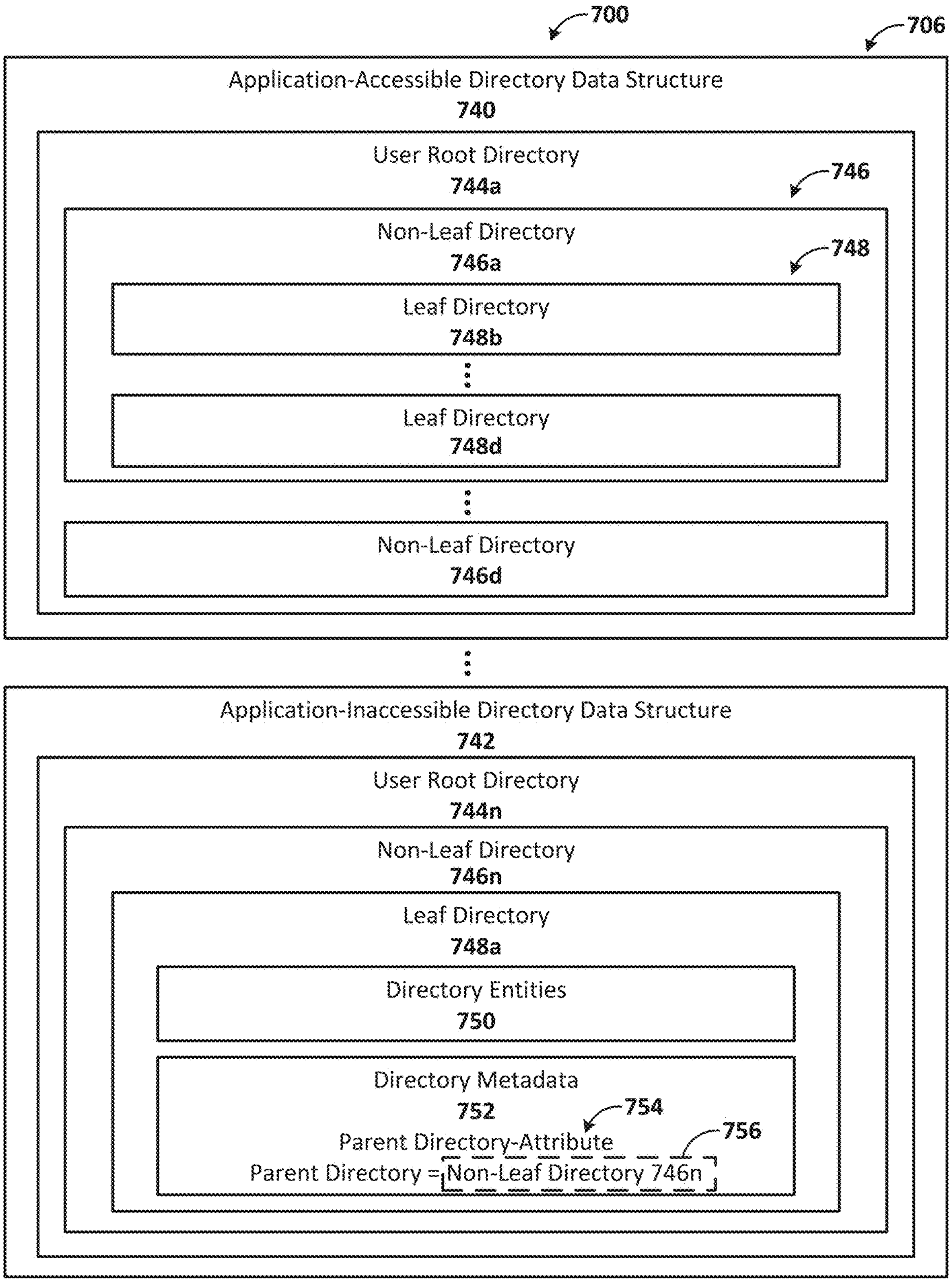

Referring to FIGS. 7E and 7F, a persistent storage media 700 may include one or more directory data structures 706, including at least one application-accessible directory data structure 740 and at least one application-inaccessible directory data structure 742. An application-accessible directory data structure 740 includes a set of one or more directories that are accessible to an application. An application may access an application-accessible directory data structure 740, for example, to locate target entities in connection with generating requests for the file system to execute target operations corresponding to the target entities. An application-inaccessible directory data structure 742 includes a set of one or more directories that are inaccessible to an application. A file system may utilize an application-inaccessible directory data structure 742 to execute operations, such as background operations, on directories that have been removed from the application-accessible directory data structure 740. The application-inaccessible directory data structure 742 may be a hidden data structure. The application-inaccessible directory data structure 742 may be hidden from view from the application.

As shown in FIGS. 7E and 7F, an application-accessible directory data structure 740 includes one or more user root directories 744. A user root directory 744 may include one or more non-leaf directories 746 and/or one or more leaf directories 748. In one example, a non-leaf directory 746 includes one or more leaf directories 748. The one or more leaf directories may include one or more pointer directory structures 708 (FIGS. 7A and 7B) and/or one or more data element directory structures 730 (FIGS. 7C and 7D). As shown in FIG. 7E, user root directory 744*a* includes non-leaf directory 746*a* and non-leaf directory 746*d*. Non-leaf directory 746*a* includes leaf directory 748*a*, leaf directory 748*b*, and leaf directory 748*d*. As shown with reference to leaf directory 748*a*, a leaf directory 748 may include one or more directory entities 750 and directory metadata 752. The one or more directory entities 750 may include entities of a pointer directory structure 708 and/or entities of a data element directory structures 730, such as leaf nodes 720, intermediate nodes 718, and/or root nodes 716 (FIGS. 7A-7D).

Referring to FIG. 7E, as shown with reference to leaf directory 748*a*, one or more directories of a directory data structure 706 include directory metadata 752. The directory metadata 752 includes a parent directory-attribute 754 that identifies a parent directory. For example, as shown with reference to leaf directory 748*a*, the parent directory-attribute 754 identifies non-leaf directory 746*a* as the parent directory of leaf directory 748*a*. Additionally, or alternatively, the directory metadata 752 may identify a child directory. In one example, leaf directory 748*a* can be identified as a child directory of non-leaf directory 746*a* based on the parent directory-attribute 754 identifying non-leaf directory 746*a* as the parent directory of leaf directory 748*a*.

In one example, the file system can transition a directory from the application-accessible directory data structure 740 to the application-inaccessible directory data structure 742 by executing an update 756 to the parent directory-attribute 754. For example, as shown in FIG. 7F with reference to leaf directory 748*a*, the update 756 executed by the file system has modified the parent directory-attribute 754 to indicate that non-leaf directory 746*n* is the parent directory of leaf directory 748*a*. The update 756 removes the parent-child association between leaf directory 748*a* and non-leaf directory 746*a* and generates a new parent-child association between leaf directory 748*a* and non-leaf directory 746*n*. As shown in FIG. 7F, leaf directory 748*a* appears in the application-inaccessible directory data structure 742 as a child directory of non-leaf directory 746*n* as a result of the update 756. Additionally, or alternatively, as a result of the update 756, leaf directory 748*a* no longer appears in the application-accessible directory data structure 740. In one example, the update 756 changes the location of the leaf directory 748*a* from the application-accessible directory data structure 740 to the application-inaccessible directory data structure 742 without physically relocating leaf directory 748*a* and/or directory entities 750 in the one or more persistent storage media 700. After executing the update 756, the file system may execute operation to remove leaf directory 748*a* and directory entities 750 from the one or more persistent storage media 700.

In one example, the update 756 includes generating one or more parent directories such as the parent directory identified by the parent directory-attribute 754. For example, the update 756 may include generating user root directory 744*n* and/or non-leaf directory 746*n*. Additionally, or alternatively, user root directory 744*n* and/or non-leaf directory 746*n* may be pre-existing in the application-inaccessible directory data structure 742 prior to the update 756.

5. Example Operations Associated with a File System

Referring now to FIGS. 8A-8E, example operations associated with a file system are further described. One or more operations described with reference to FIGS. 8A-8E may be modified, rearranged, or omitted. Accordingly, the particular sequence of operations described with reference to FIGS. 8A-8E should not be construed as limiting the scope of one or more embodiments. In one example, the operations described with reference to FIGS. 8A-8E may be performed by one or more features of the system described with reference to FIGS. 6A and 6B.

Figure 8A:
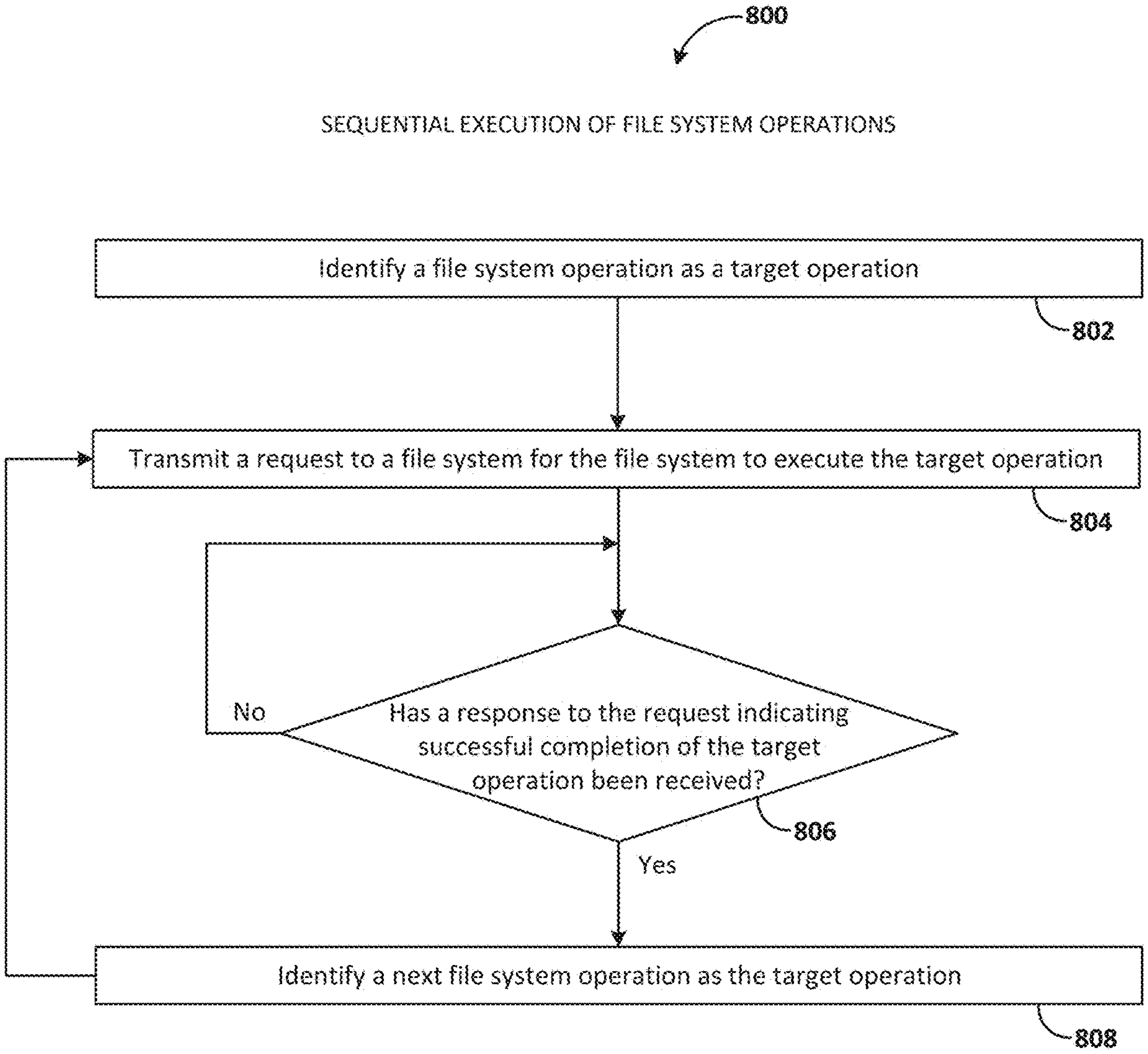
FIGS. 8A-8E schematically depict example operations associated with a file system in accordance with one or more embodiments.

As described with reference to FIG. 8A, an application may execute a workflow that includes one or more application operations that depend on successful execution of one or more target operations associated with a file system. The target operations may be performed by the file system, for example, in response to a request from the application. The application may pause its workflow and await a response from the file system that satisfies the dependency on the successful execution of the one or more target operations. In one example, as further described below with reference to FIGS. 8A-8E, the file system receives the request from the application to execute one or more target operations and transmits a response to the application prior to executing the one or more target operations. The response from the file system satisfies the dependency on the successful execution of the one or more target operations because the file system sends the response after storing data in one or more persistent storage media for future reference when executing the one or more target operations. Based on receipt of the response, the application resumes execution of the workflow, including executing the one or more application operations that depend on successful execution of one or more target operations associated with a file system.

A. Executing Application Operations That Depend On Successful Execution Of Target Operations Associated With A File System Referring to FIG. 8A, operations 800 of an application that depend on successful execution of target operations by a file system are further described. As shown in FIG. 8A, an application identifies a file system operation as a target oration (Operation 802). In one example, the application determines that the file system operation is to be executed as part of a workflow being executed by the application. The file system operation may occur in a sequence of operation, such as in application logic executed by the application. Additionally, or alternatively, the application may identify the file system operation in response to an input or command, such as from a user or a computing entity that utilize the application.

The application transmits a request to the file system, for the file system to execute the target operation (Operation 804). The target operation may include a file system operation corresponding to a target entity, such as storing, retrieving, modifying, or deleting data. The target entity may include a data structure where a data element or a file is located and/or a data element or a file that is subjected to the target operation. The application may transmit the request to the file system via an API that the system exposes to the application for making requests to the file system.

After sending the request to the file system, the application determines whether a response has been received to the request indicating successful completion of the target operation (Operation 806). In one example, the response includes an indication that execution of the target operation is complete. The application may determine that the response to the request has been received from the file system by directly or indirectly receiving the response. The application may determine whether the response to the request been received by checking a status of a blocking call corresponding to the request to determine whether the blocking call is waiting for a response. Additionally, or alternatively, the application may receive a notification when the blocking call is released based on the response from the file system. Additionally, or alternatively, the application may monitor a transaction sequence number to determine whether a response has been received.

When the application receives a response to the request, the application identifies a next file system operation as the target operation (Operation 808). The application may identify the next file system operation as the target operation before, after, or concurrently with execution of the application operation. In one example, the application executes an application operation that is dependent upon successful execution of the target operation. The application operation may include an operation that utilizes a data element or file corresponding to the target operation. The application operation may include operations associated with a workflow executed by the application. The workflow executed by the application may include one or more of the following: data processing, configuration, content generation, content delivery, data synchronization, backup and recovery, data replication, task coordination, file sharing, service discovery, user authentication, fault tolerance, or data recovery. Additionally, or alternatively, the workflow may be associated with one or more of the following: business processes, customer relationships, order processing, real-time analytics, machine learning, artificial intelligence, document management, employee management, communications, or financial services.

B. Executing Logging Operations In Response To Requests From Applications To Execute Target Operations Referring to FIG. 8B, operations 810 of a file system that are executed in response to requests from an application are further described. As described with reference to FIG. 8B, in response to a request from an application to execute a target operation in one or more persistent storage media, a file system may execute one or more operations that are different from the target operation. Prior to executing the target operation in the one or more persistent storage media, the file system may store data for executing the target operation in an operation log stored in the one or more persistent storage media. Additionally, or alternatively, prior to executing the target operation in the one or more persistent storage media, the file system may execute the target operation in one or more transient storage media. The file system may transmit a response to the application that is based on completion of the one or more operations that are different from the target operation. After transmitting the response to the application, the file system may complete execution of the target operation in the one or more persistent storage media by persisting the target operation from the one or more transient storage media to the one or more persistent storage media. Additionally, or alternatively, after transmitting the response to the application, the file system may complete execution of the target operation in the one or more persistent storage media based on the data from the operation log stored in the one or more persistent storage media.

In one example, as described with reference to FIG. 8B, when a target operation is associated with an operation type of “put” or “delete,” the one or more operations that are different from the target operation include a logging operation. The logging operation includes writing metadata to a log entry of a data structure stored in the one or more persistent storage media. Additionally, or alternatively, as further described below, when a target operation is associated with an operation type of “retain,” the one or more operations that are different from the target operation may include a logging operation and a directory modification operation. The directory modification operation includes changing a directory data structure that identifies a target entity corresponding to the target operation such that the target entity is no longer locatable by the application.

Figure 8B:
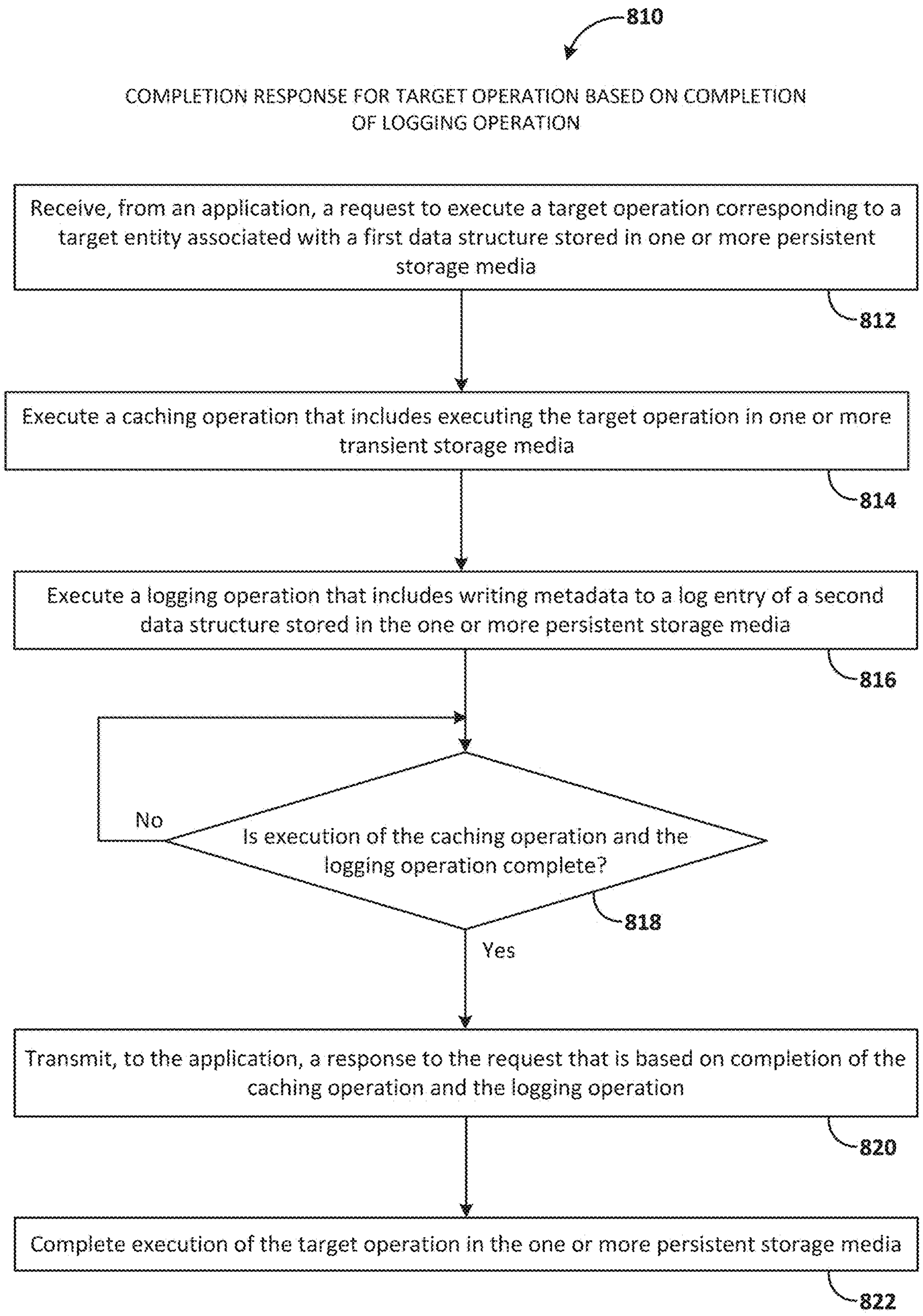

As shown in FIG. 8B, a file system receives a request from an application to execute a target operation corresponding to a target entity associated with a first data structure stored in one or more persistent storage media (Operation 812). The target operation may include storing, modifying, or updating a file or a data element. The target entity may include at least a portion of the data structure and/or at least a portion of the file or data element. The file system may receive the request from the application via an API that the system exposes to the application for making requests to the file system.

In response to receiving the request to execute the target operation, the file system executes a caching operation (Operation 814) and a logging operation (Operation 816). The caching operation can be executed before, after, or concurrently with the logging operation. The caching operation includes executing the target operation in transient storage media. The logging operation is different from the target operation. The logging operation includes writing metadata to a log entry of a second data structure stored in the one or more persistent storage media. In one example, a time for the file system to execute and persist the logging operation is shorter than a time for the file system to execute the target operation. Additionally, or alternatively, a time for the file system to execute the caching operation and the logging operation is shorter than a time for the file system to execute and persist the target operation. The second data structure may include an operation log. The file system may generate a log entry in the second data structure and write the metadata to the log entry. The log entry includes an operation type-identifier that serves as an indicator for one or more target operations to be executed by the file system based on the log entry. Additionally, the log entry includes a target entity-identifier that serves as an indicator for one or more target entities corresponding to the one or more target operations. In one example, the log entry includes a target value associated with the target entity. The target value may represent data for storing, modifying, or updating a file or data element. In one example, the log entry includes a status indicator that indicates whether the one or more target operations corresponding to the log entry are incomplete or complete. Upon completing the logging operation, the status indicator indicates that the one or more target operations corresponding to the log entry have a status of “incomplete.”

The file system generates the log entry based at least in part on information associated with the request from the application to execute the one or more target operations. In one example, the file system utilizes information contained in the request from the file system to generate the log entry. Additionally, or alternatively, the file system may retrieve information from one or more data structures to generate the log entry. The file system may format the log entry, for example, by generating a timestamp, a unique identifier, or metadata describing the log entry and/or the one or more target operations corresponding to the log entry. The file system may acquire a write lock to at least a portion of the operation log when writing to the log entry, for example, to prevent other computing resources from concurrent writes or other access to the operation log. The file system may generate the log entry in accordance with an append mode, where new entries are appended to the end of the operation log. Additionally, or alternatively, the file system may generate the log entry in accordance with a journal mode, where new entries are written to a journal (e.g., a write-ahead-log) prior to being written to the operation log.

The file system determines whether execution of the caching operation and the logging operation are complete (Operation 818). The file system determines whether execution of the caching operation and the logging operation are complete based on one or more mechanisms that verify the success of the caching operation and the logging operation at one or more stages. These mechanisms ensure that data corresponding to the caching operation has been safely and fully written to one or more transient storage media, for example, in a cached directory data structure and/or in a cached file data structure. Additionally, or alternatively, these mechanisms ensure that data corresponding to the logging operation has been safely and fully written to one or more persistent storage media, for example, in the operation log located in the one or more persistent storage media.

In one example, determining that execution of the caching operation is complete includes determining that the target operation is executed with respect to a cached file data structure and a cached directory data structure in the one or more transient storage media. In one example, the file system executes a call to execute the caching operation. The file system may monitor a return value of the call that indicates that execution of the caching operation is complete. Additionally, or alternatively, a storage device that houses the one or more transient storage media may send a hardware-level acknowledgment to the file system after the caching operation has been executed. Additionally, or alternatively, the file system may monitor a log sequence number, a transaction state, and/or a write lock to determine whether execution of the caching operation is complete. Additionally, or alternatively, the file system may execute a checksum operation to verify that the caching operation is complete.

In one example, determining that execution of the logging operation is complete includes determining that the metadata is persistently stored in the one or more persistent storage media. Additionally, or alternatively, execution of the logging operation may include storing data in a file data structure of persistent storage media. In one example, the file system executes a call to generate the log entry, to write data to the log entry, and/or to store data in the file data structure. The file system may monitor a return value of the call that indicates that the log entry has been written to the operation log, that data has been written to the log entry, and or that the data has been stored in the file data structure. Additionally, or alternatively, a storage device that houses the one or more persistent storage media may send a hardware-level acknowledgment to the file system after the data has been successfully stored. Additionally, or alternatively, the file system may monitor a log sequence number, a transaction state, and/or a write lock to determine whether execution of the logging operation is complete. Additionally, or alternatively, the file system may execute a checksum for the log entry, the data to be written to the log entry, and/or the data to be stored in the file data structure. After generating the log entry, after writing the data to the log entry, and/or after storing the data in the file data structure, the file system may read back the log entry and/or the data and recompute the checksum to verify that the recomputed checksum matches the previous checksum.

When the file system determines that the caching operation and/or the logging operation are complete, the file system transmits, to the application, a response to the request that is based on completion of the caching operation and/or the logging operation (Operation 820). In one example, the response includes an indication that execution of the target operation is complete. From the application's perspective, the application may be unaware of the caching operation and/or the logging operation. In one example, the response includes an acknowledgement without specifically indicating that any operation has been completed. The response satisfies a dependency of the application on the successful execution of the target operation even though the target operation has not yet been completed. The target operation is subsequently completed in the one or more persistent storage media based on data in the transient storage media and/or based on the log entry stored in the operation log. The file system may directly or indirectly transmit the response to the application. In one example, the file system transmits a message that is based on completion of the caching operation and/or the logging operation. Additionally, or alternatively, the file system may transmit a response that releases a blocking call initiated by the application when transmitting the request to the file system. Additionally, or alternatively, the file system may update a transaction sequence number that is monitored by the application to determine whether a response has been received that satisfies a dependency of the application.

After transmitting the response to the application, the file system completes execution of the target operation in the one or more persistent storage media (Operation 822). The file system may execute the target operation by executing one or more additional operations, for example, in a background process. In one example, the file system completes execution of the target operation by persisting data from the one or more transient storage media to the one or more persistent storage media. Additionally, or alternatively, the file system completes execution of the target operation based on the metadata of the log entry in the operation log. In one example, completion of the target operation includes updating a directory data structure in the one or more persistent storage media to reflect an update to a file data structure in the one or more persistent storage media. Completion of the target operation may include updating the directory data structure to include a pointer that points to a data element in the file data structure corresponding to the target operation. Additionally, or alternatively, completion of the target operation may include updating the directory data structure to delete a pointer corresponding to a data element that was deleted from the file data structure.

In one example, the file system does not complete execution of the target operation by persisting data from the one or more transient storage media to the one or more persistent storage media. For example, because metadata for completing the target operation is stored in the operation log, the file data does not need to persist data from the one or more transient storage media to the one or more persistent storage media. The file system can complete execution of the target operation based on the metadata, for example, in response to a particular reason. Additionally, or alternatively, the file system can postpone completion of the target operation. In one example, the file system can complete execution of multiple target operations in batches. Additionally, or alternatively, the file system can complete execution of target operations when computing resources satisfy an availability threshold.

In one example, the file system receives a request from the application to execute a target operation associated with an operation type of "retain." The target operation may include storing an identifier element associated with a target entity in a retention directory in connection with a remove or delete operation associated with the target entity. The identifier element may include a key-value pair. A key of the key-value pair may include a name of a target entity, such as a name of a file or a name of a data element. A value of the key-value pair may include a pointer that points to a location of the target entity, such as a location of the file or data element stored in a persistent storage medium. The target entity may include at least a portion of the data structure and/or at least a portion of the file or data element.

In one example, in response to a request from the application to execute a target operation associated with the operation type of "retain," the caching operation executed by the file system includes a directory modification operation. The directory modification operation includes storing, in a first cached directory data structure, a first identifier element that identifies the target entity in the first cached directory data structure. Additionally, or alternatively, the directory modification operation may include deleting, from a second cached directory data structure, a second identifier element that identifies the target entity in the first cached directory data structure. The combination of storing the first identifier element in the first cached directory data structure and deleting the second identifier element from the second cached directory data structure effectively changes the cached directory data structure that identifies the target entity from the second cached directory data structure to the first cached directory data structure. As a result of the directory modification operation, the target entity is no longer locatable by the application in the second cached directory data structure.

The file system determines whether execution of the directory modification operation is complete based on one or more mechanisms that verify the success of the directory modification operation at one or more stages. These mechanisms ensure that the first identifier element that identifies the target entity has been safely and fully written to the first cached directory data structure. Additionally, these mechanisms ensure that the second identifier element that identifies the target entity has been deleted from the second cached directory data structure. In one example, the file system executes one or more calls to execute the directory modification operation. The file system may monitor one or more return values of the one or more calls that indicates that one or more portions of the directory modification operation are complete. For example, the file system may execute a first call to write the first identifier element to the first cached directory data structure and a second call to delete the second identifier element from the cached second directory data structure. Additionally, or alternatively, a storage device that houses the one or more transient storage media may send a hardware-level acknowledgment to the file system after the first identifier element has been written to the first cached directory data structure and/or after the second identifier element has been deleted from the second cached directory data structure. Additionally, or alternatively, the file system may monitor a log sequence number, a transaction state, and/or a write lock to determine whether execution of one or more portions of the directory modification operation is complete. Additionally, or alternatively, the file system may compare checksums corresponding the first identifier element prior to and after writing to the first cached directory data structure to verify, based on the checksums, that the first identifier element has been written to the first cached directory data structure. Furthermore, the file system may compare checksums corresponding the second identifier element prior to and after deleting from the second cached directory data structure to verify, based on the checksums, that the second identifier element has been deleted from the second cached directory data structure.

When the file system determines that execution of the logging operation and the caching operation that includes the directory modification operation are complete, the file system transmits, to the application, a response to the request that is based on completion of the logging operation and the caching operation that includes the directory modification operation. In one example, the response includes an indication that execution of the target operation is complete. From the application's perspective, the application may be unaware of the logging operation and/or the caching operation that includes the directory modification operation. In one example, the response includes an acknowledgement without specifically indicating that any operation has been completed. The response satisfies a dependency of the application on the successful execution of the target operation even though the target operation has not yet been completed. The target operation is subsequently completed in the one or more persistent storage media based on the log entry stored in the operation log and/or based on the first identifier element in the first cached directory data structure in the transient storage media. The file system may directly or indirectly transmit the response to the application. In one example, the file system transmits a message that is based on completion of the logging operation and/or the directory modification operation. Additionally, or alternatively, the file system may transmit a response that releases a blocking call initiated by the application when transmitting the request to the file system. Additionally, or alternatively, the file system may update a transaction sequence number that is monitored by the application to determine whether a response has been received that satisfies a dependency of the application.

E. Executing Parent Directory-Attribute Update Operations In Response To Requests From Applications To Remove A Target Directory Referring to FIGS. 8C and 8D, operations 810 of a file system that are executed in response to requests from an application are further described. As described with reference to FIG. 8C, in response to a request from an application to execute a target operation in one or more persistent storage media, a file system may execute one or more operations that are different from the target operation. Prior to executing the target operation in the one or more persistent storage media, the file system may execute the target operation in one or more transient storage media. Additionally, or alternatively, prior to executing the target operation in the one or more persistent storage media, the file system may store data for executing the target operation in an operation log stored in the one or more persistent storage media. The file system may transmit a response to the application that is based on completion of the one or more operations that are different from the target operation. After transmitting the response to the application, the file system may complete execution of the target operation in the one or more persistent storage media by persisting the target operation from the one or more transient storage media to the one or more persistent storage media. Additionally, or alternatively, after transmitting the response to the application, the file system may complete execution of the target operation in the one or more persistent storage media based on the data from the operation log stored in the one or more persistent storage media.

In one example, as described with reference to FIG. 8C, when a target operation is associated with an operation type of "remove directory," the one or more operations that are different from the target operation include executing a caching operation that includes a parent directory-attribute update operation. The parent directory-attribute update operation includes modifying a parent directory of a target directory identified by a parent directory-attribute of the target directory. The parent directory-attribute update operation removes the target directory from a cached directory data structure that is accessible by the application. The cached directory data structure is located in one or more transient storage media. The target directory is removed from the cached directory data structure that is accessible by the application by associating the target directory with a different parent directory that is not accessible by the application. The target directory is associated with the different parent directory by updating the parent directory-attribute of the target directory to identify the different parent directory.

Execution of the parent directory-attribute update operation removes the target directory from the perspective of the application. The target directory exists as a subdirectory of the different parent directory that is not accessible by the file system. After executing the parent directory-attribute update operation of the caching operation, the file system may execute an additional caching operation that includes removing or deleting the target directory from the directory data structure stored in the one or more transient storage media, for example, as described with reference to FIG. 8D. The parent directory-attribute update operation allows the application to proceed with application operations as though the target directory was removed or deleted and prior to the file system actually removing or deleting the target directory from the directory data structure. The file system removes or deletes the target directory when executing the additional caching operation. The file system may execute the additional caching operation, for example, in a background process that occurs after responding to the request from the application.

Figure 8C:
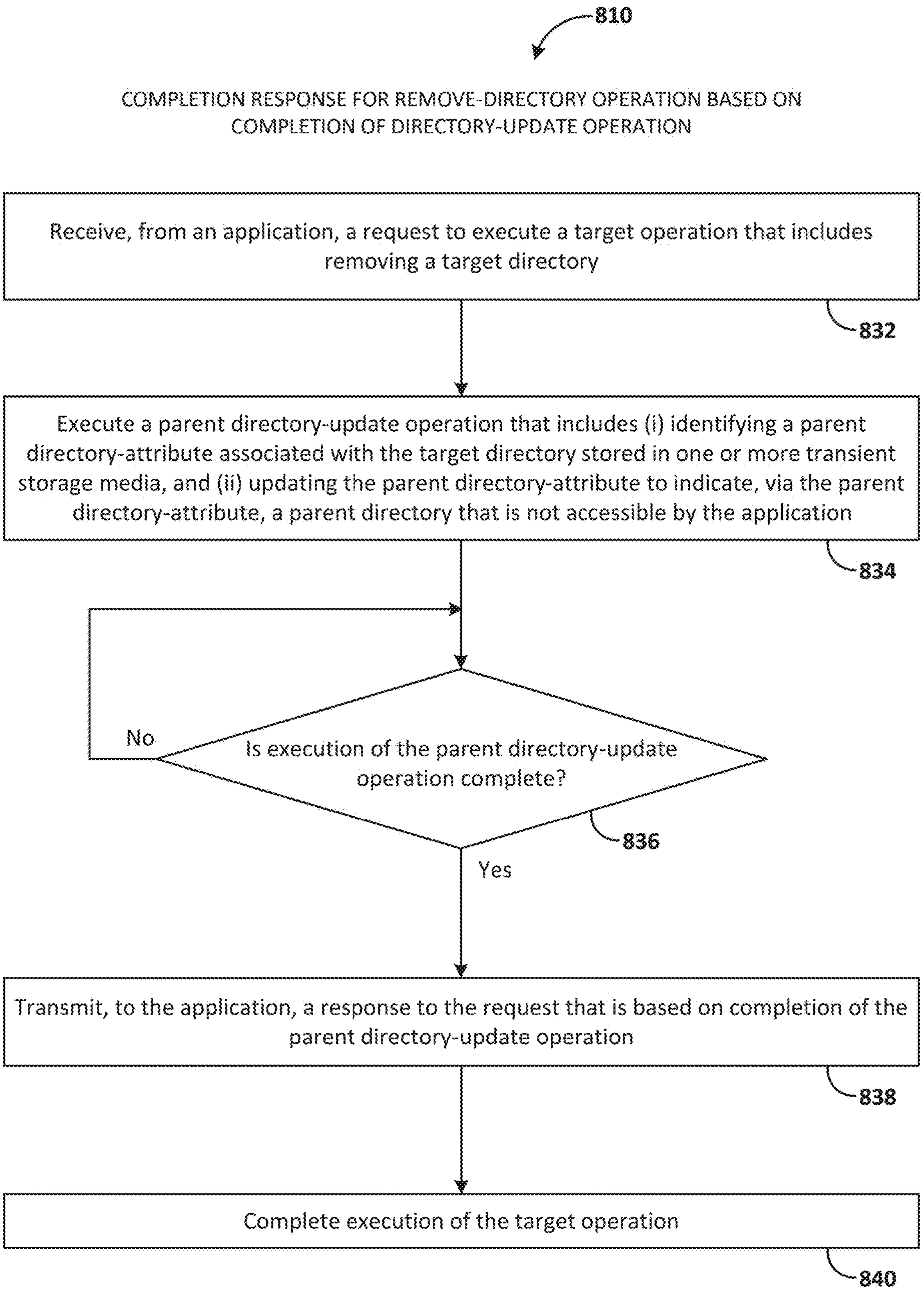

As shown in FIG. 8C, a file system receives a request from an application to execute a target operation that includes removing a target directory (Operation 832). The file system may receive the request from the application via an API that the system exposes to the application for making requests to the file system.

In response to receiving the request to execute the target operation, the file system executes caching operation that includes a parent directory-update operation (Operation 834). The parent directory-update operation is different from the target operation. The parent directory-update operation includes (i) identifying a parent directory-attribute associated with the target directory stored in one or more transient storage media and (ii) updating the parent directory-attribute to indicate, via the parent directory-attribute, a parent directory that is not accessible by the application. In one example, the file system updates the parent directory-attribute to identify a first parent directory. The file system may add the target directory as a subdirectory of the first parent directory. The first parent directory and the target directory may be located in a data structure stored in one or more transient storage media. In one example, prior to updating the parent directory-attribute to identify the first parent directory, the parent directory-attribute identifies a second parent directory located in a data structure stored in one or more transient storage media. In one example, metadata corresponding to the second parent directory is located in a directory data structure for use by the application. In one example, the application may utilize the metadata to identify target entities in connection with generating requests to execute target operations pertaining to the target entities. In one example, the file system generates the first parent directory in the directory data structure stored in one or more transient storage media prior to adding the target directory as a subdirectory of the first parent directory.

In one example, the parent directory-attribute is located in metadata corresponding to the target directory. The file system may identify the metadata corresponding to the target directory, and based on the metadata, the file system may identify the parent directory-attribute. The metadata may be stored in a data structure located in one or more transient storage media. In one example, updating the parent directory-attribute may include modifying the metadata to indicate a parent directory that is not accessible by the application. Additionally, or alternatively, updating the parent directory-attribute may include modifying the metadata to remove an indication of a parent directory that is accessible by the application and generating additional metadata to indicate a different parent directory that is not accessible by the application. In one example, at least a portion of the metadata is not accessible by the application. Additionally, or alternatively, a data structure where the metadata is stored is not accessible by the application.

The file system determines whether execution of the parent directory-update operation is complete (Operation 836). The file system determines whether execution of the parent directory-update operation is complete based on one or more mechanisms that verify the success of the parent directory-update operation at one or more stages. These mechanisms ensure that data corresponding to the parent directory-update operation has been safely and fully written to one or more transient storage media, for example, in metadata located in the one or more transient storage media. In one example, determining that execution of the parent directory-update operation is complete includes determining that the metadata is persistently stored in the one or more transient storage media. In one example, the file system executes a call to update metadata that includes the parent directory attribute. The file system may monitor a return value of the call that indicates that the metadata has been updated.

In one example, the parent directory-update operation is executed in connection with a logging operation, for example, as described above with reference to FIG. 8B. The target operation corresponding to the parent directory-update operation may be recorded in an operation log. The logging operation may include writing metadata to a log entry of an operation log stored in one or more persistent storage media. The metadata may include an operation type-identifier that identifies the target operation and a target-identifier that identifies a target entity corresponding to the target operation. The target operation may include removing or deleting the target directory. The target entity may include the target directory. In one example, the target operation may additionally include removing or deleting a file or a data element identified by the target directory.

When the file system determines that the parent directory-update operation is complete, the file system transmits, to the application, a response to the request that is based on completion of the parent directory-update operation (Operation 838). In one example, the response includes an indication that execution of the parent directory-update operation is complete. From the application's perspective, the application may be unaware of the parent directory-update operation. In one example, the response includes an acknowledgement without specifically indicating that any operation has been completed. The response satisfies a dependency of the application on the successful execution of the target operation even though execution of the target operation in the one or more persistent storage media has not yet been completed. The target operation is persisted to the one or more persistent storage media after transmitting the response to the application based on execution of the parent directory-update operation. The file system may directly or indirectly transmit the response to the application. In one example, the file system transmits a message that is based on completion of the parent directory-update operation. Additionally, or alternatively, the file system may transmit a response that releases a blocking call initiated by the application when transmitting the request to the file system. Additionally, or alternatively, the file system may update a transaction sequence number that is monitored by the application to determine whether a response has been received that satisfies a dependency of the application.

After transmitting the response to the application, the file system completes execution of the target operation, including removing the target directory from one or more storage media (Operation 840). The file system may execute the target operation by executing one or more additional operations, for example, in a background process. In one example, the file system completes execution of the target operation by removing the target directory from one or more transient storage media and then persisting data from the one or more transient storage media to one or more persistent storage media. Additionally, or alternatively, the file system may complete execution of the target operation in the one or more persistent storage media, for example, based on the metadata of a log entry in the operation log. In one example, a time for the file system to execute the parent directory-update operation is shorter than a time for the file system to execute and persist the target operation. Additionally, or alternatively, a time for the file system to execute a caching operation corresponding to the parent directory-update operation is shorter than a time for the file system to execute and persist the target operation.

Figure 8D:
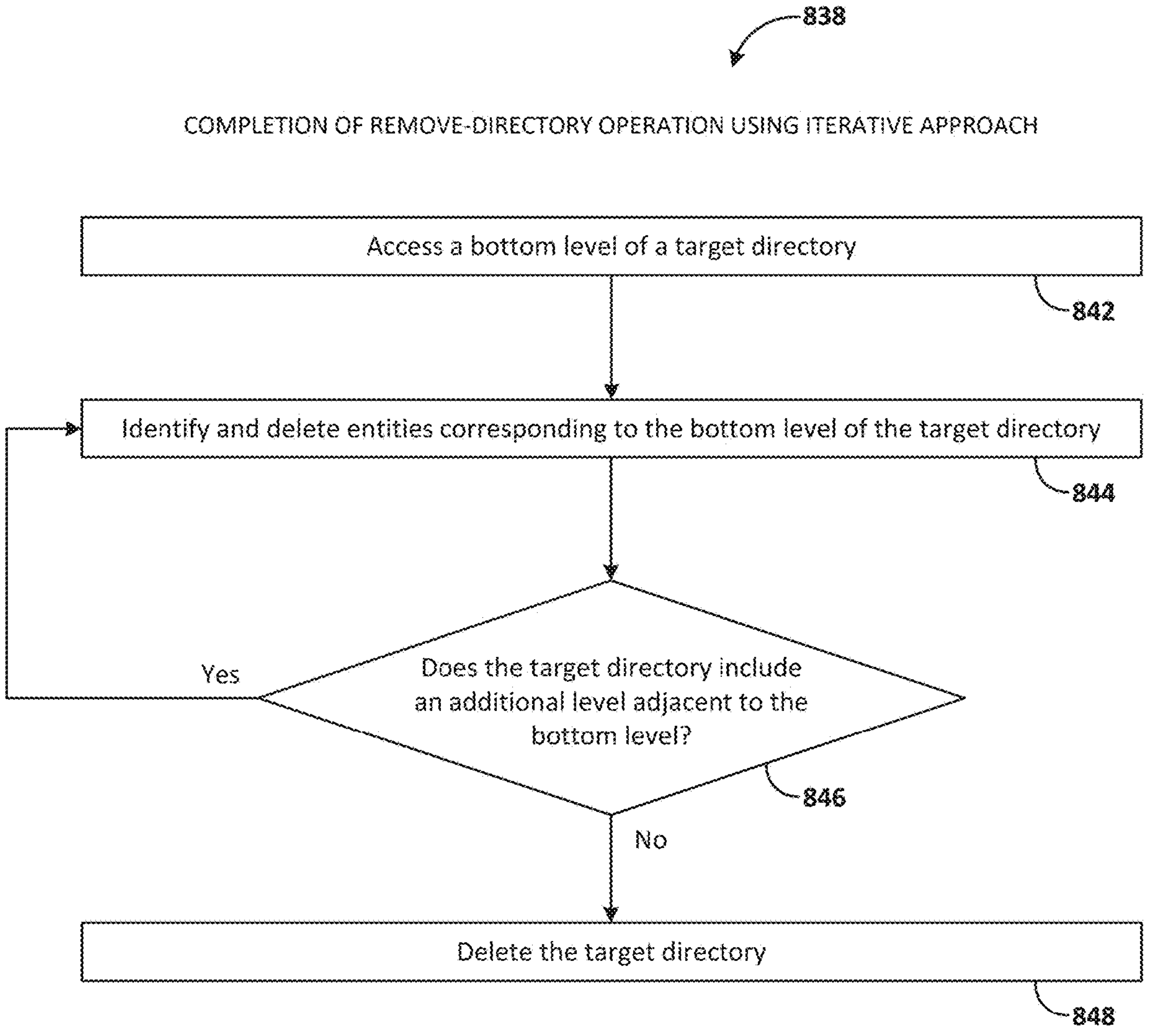
Figure 8E:
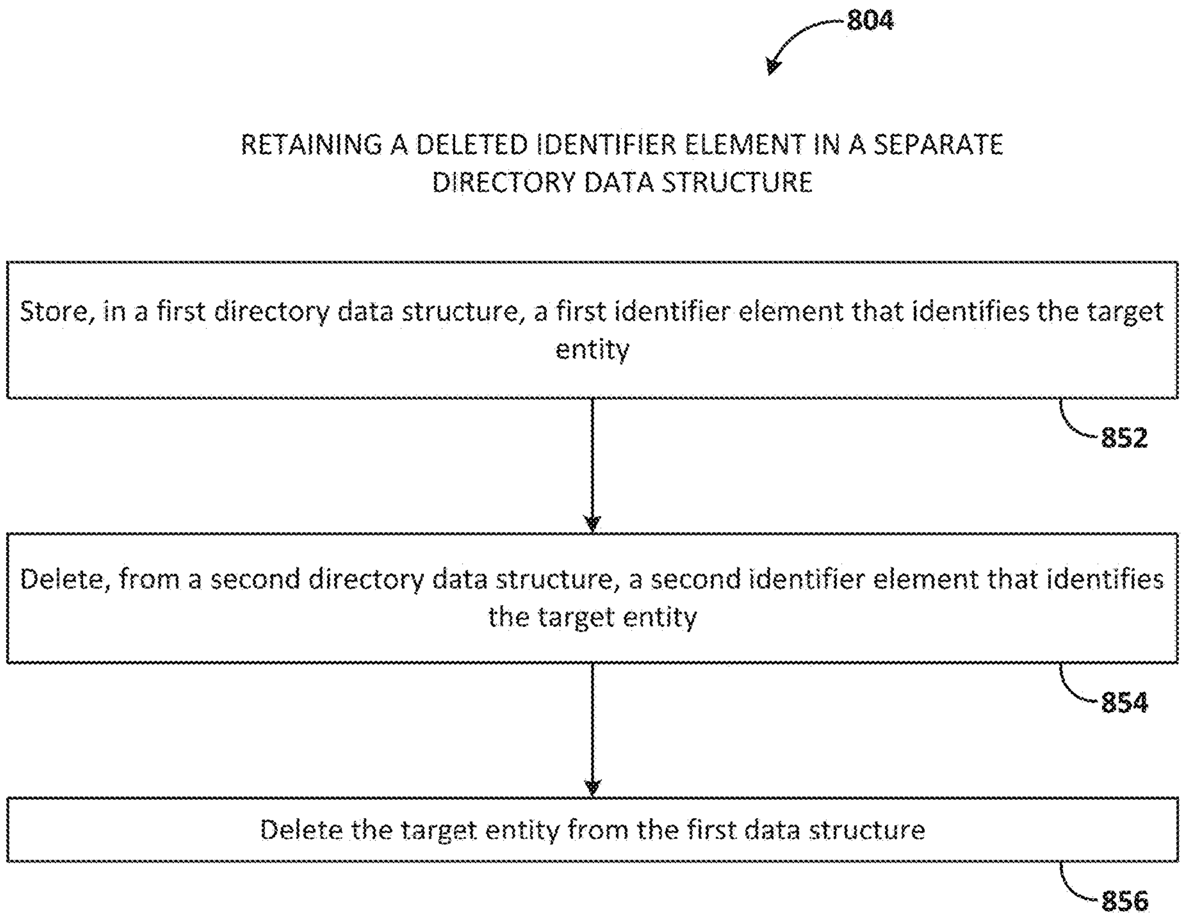

Referring to FIG. 8D, execution of target operations that include removing a target directory from one or more transient storage media are further described. The file system may execute one or more operations to remove a target directory from one or more transient storage media. The one or more operations may include iteratively deleting entities from the target directory. In one example, as described with reference to FIG. 8D, the operation may include removing or deleting a target directory from a directory data structure. The file system may execute the target operation on a cached version of a directory data structure stored in one or more transient storage media. After executing the target operation on the cached version of the directory data structure stored in the one or more transient storage media, the file system may persist the target operation from the one or more transient storage media to one or more persistent storage media. Additionally, or alternatively, the file system may execute the target operation on the directory data structure stored in the one or more transient storage media In one example, the target operation includes deleting a target entity identified by the target directory and deleting the target directory. The target entity may include a data element or file stored in the target directory. Additionally, or alternatively, the target entity may include a data element or file identified by a pointer stored in the target directory. The file system may execute the operations described with reference to FIG. 8D to remove the target directory from the directory data structure.

To delete entities from a target directory, the file system iteratively deletes entities starting from a bottom level of the target directory and working upwards through the various levels of the target directory until the entities corresponding to the various levels have been deleted. As shown in FIG. 8D, the file system accesses a bottom level of a target directory (Operation 842). To access the bottom level of the target directory, the file system may start at a root directory of the directory data structure and traverse the directory data structure until arriving at the bottom level of the target directory. When the file system arrives at the bottom level of the target directory, the file system identifies and deletes entities corresponding to the bottom level of the target directory (Operation 844). In one example, the file system identifies the entities based on entity-identifiers. The entities may include one or more of the following: subdirectories, data elements and/or files, or pointers to data elements and/or files. The file system deletes at least a subset of the entities corresponding to the bottom level of the target directory. In one example, the file system deletes all entities corresponding to the bottom level of the target directory. Additionally, or alternatively, the subset of entities deleted from the bottom level of the target directory includes data elements and/or files and/or pointers to data elements and/or files.

After the file system deletes at least the subset of entities corresponding to the bottom level of the target directory, the file system determines whether the target directory includes an additional level adjacent to the bottom level (Operation 846). The file system may determine whether the target directory includes an additional level adjacent to the bottom level by traversing the directory data structure. Based on the subset of entities corresponding to the bottom level of the target directory having been deleted, the bottom level may no longer exist, and/or the additional level may represent a new bottom level based on the previous bottom level having been deleted. When the file system determines that target directory includes an additional level, the file system identifies and deletes at least the subset of entities corresponding to the additional level of the target directory.

In one example, the file system deletes one or more pointers from the target directory that point to a data element and/or file located in a data structure stored in persistent memory. Additionally, or alternatively, the file system may delete one or more data elements and/or files from the data structure that are identified by the one or more pointers. In one example, a pointer in the target directory identifies a location of a target entity stored in the one or more persistent storage media.

When the file system determines that the target directory does not include an additional level, the file system deletes the target directory (Operation 848). In one example, after deleting the target directory, the file system may delete a parent directory of the target directory. Prior to deleting the target directory, the target directory is a child directory of the parent directory. Additionally, or alternatively, prior to deleting the target directory, the file system may delete a child directory of the target directory, where the target directory is a parent directory of the child directory.

F. Retaining A Deleted Identifier Element In A Separate Directory Data Structure Referring to FIG. 8E, execution of target operations are further described. In one example, a target operation is associated with an operation type of "retain." In one example, when a target operation is associated with an operation type of "retain," the file system executes a directory modification operation in connection with executing the target operation. When the file system executes the directory modification operation, the operations include storing, in a first directory data structure, a first identifier element that identifies the target entity (Operation 852), and deleting from a second directory data structure located in the one or more persistent storage media, a second identifier element that identifies the target entity (Operation 854). The firs directory data structure and the second directory data structure may be located in the one or more transient storage media. In one example, the first directory data structure is a retention directory, and the second directory data structure is a pointer directory structure. Operation 852 and operation 856 represent the directory modification operation. After performing the directory modification operation, the file system deletes the target entity from the first directory data structure (Operation 856). The identifier element may include a key-value pair, where a key of the key-value pair includes a name of a target entity, such as a name of a file or data element, and a value of the key-value pair includes a pointer that points to a location of the target entity, such as a location of the file or data element stored in a persistent storage medium.

6. Miscellaneous; Extensions

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein.

What is claimed is:

1. A method, comprising:

receiving, at a file system, a first request from an application for the file system to execute a first target operation corresponding to a first target entity;

responsive at least to receiving the first request to execute the first target operation, executing, by the file system, a first logging operation comprising writing metadata to a first log entry of a first data structure stored in one or more persistent storage media;

determining, by the file system, that execution of the first logging operation is complete;

transmitting, from the file system to the application, a response to the first request that is based on completion of the first logging operation, the first logging operation being different than the first target operation requested by the first request;

wherein based on receipt of the response to the first request, the application executes an application operation prior to the file system completing execution of the first target operation;

subsequent to transmitting the response to the application:

accessing the first log entry;

executing the first target operation on the first target entity based at least in part on the first log entry, wherein executing the first target operation (a) modifies a second data structure that corresponds to the first target entity and is stored in one or more transient storage media, and (b) results in generation of an updated second data structure;

persisting, to the one or more persistent storage media, data corresponding to the updated second data structure resulting from executing the first target operation, wherein the method is performed by at least one device including a hardware processor.

2. The method of claim 1, wherein executing the first target operation comprises generating a third data structure in the one or more transient storage media.

3. The method of claim 2, wherein the first data structure comprises an operation log, and wherein the second data structure comprises a tree structure.

4. The method of claim 1, further comprising:

subsequent to transmitting the response, executing the first target operation on a third data structure stored in one or more persistent storage media.

5. The method of claim 4, further comprising:

executing the first target operation on the third data structure based on the metadata of the first log entry.

6. The method of claim 1, wherein the application executes operations comprising:

accessing a workflow; and executing the workflow, wherein the workflow comprises executing the application operation subsequent to the first target operation.

7. The method of claim 1, wherein the application executes operations comprising:

accessing a workflow; and executing the workflow, wherein the workflow comprises executing the application operation that is dependent upon successful execution of the first target operation, wherein based on receipt of the response to the first request, the application executes the application operation prior to the file system completing execution of the first target operation.

8. The method of claim 1, wherein the response comprises an indication that execution of the first target operation is complete.

9. The method of claim 1, wherein the response comprises at least one of:

an acknowledgement;

a first indication of successful execution of the first target operation; or a second indication of successful execution of the first logging operation.

10. The method of claim 1, wherein the response is transmitted prior to execution of the first target operation being completed by the file system.

11. The method of claim 1, wherein determining that execution of the first logging operation is complete comprises determining that the metadata is persistently stored in the one or more persistent storage media.

12. The method of claim 1, wherein the metadata comprises an operation type-identifier that identifies an operation type of the first target operation, and a target-identifier that identifies the first target entity.

13. The method of claim 1, further comprising:

subsequent to transmitting the response to the application:

performing one or more additional operations on the one or more persistent storage media to further execute the first target operation.

14. The method of claim 13, wherein the one or more additional operations are performed by a background process.

15. The method of claim 1,
wherein:
the first target operation is associated with an operation type of delete;
wherein the method further comprises:
further responsive to receiving the first request to execute the first target operation and prior to transmitting the response to the application:
storing, in a first directory data structure located in one or more transient storage media, a first identifier element that identifies the first target entity;
deleting, from a second directory data structure located in the one or more transient storage media, a second identifier element that identifies the first target entity.

16. The method of claim 15, further comprising:
subsequent to transmitting the response to the application:
executing the first target operation, wherein the first target operation comprises deleting the first target entity from the second data structure.

17. The method of claim 1, wherein:
the first target operation is associated with an operation type of put;
wherein the first request comprises a target value associated with the first target entity,
wherein the first target operation comprises writing the target value to the second data structure.

18. The method of claim 17, further comprising:
subsequent to transmitting the response to the application, completing execution of the first target operation at least by updating a directory data structure stored in the one or more persistent storage media.

19. The method of claim 17, wherein the first log entry comprises the target value.

20. The method of claim 1,
wherein:
the first target operation is associated with an operation type of delete;
wherein the method further comprises:
deleting the first target entity from the second data structure.

21. The method of claim 1, wherein a first time for the file system to execute the first logging operation is shorter than a second time for the file system to execute the first target operation.

22. One or more non-transitory computer-readable media comprising instructions that, when executed by one or more hardware processors, cause performance of operations comprising:
receiving, at a file system, a first request from an application for the file system to execute a first target operation corresponding to a first target entity;
responsive at least to receiving the first request to execute the first target operation, executing, by the file system, a first logging operation comprising writing metadata to a first log entry of a first data structure stored in one or more persistent storage media;
determining, by the file system, that execution of the first logging operation is complete;
transmitting, from the file system to the application, a response to the first request that is based on completion of the first logging operation, the first logging operation being different than the first target operation requested by the first request;
wherein based on receipt of the response to the first request, the application executes an application operation prior to the file system completing execution of the first target operation;
subsequent to transmitting the response to the application:
accessing the first log entry;
executing the first target operation on the first target entity based at least in part on the first log entry,
wherein executing the first target operation (a) modifies a second data structure that corresponds to the first target entity and is stored in one or more transient storage media, and (b) results in generation of an updated second data structure;
persisting, to the one or more persistent storage media, data corresponding to the updated second data structure resulting from executing the first target operation.

23. A system comprising:
at least one device including a hardware processor;
the system being configured to perform operations comprising:
receiving, at a file system, a first request from an application for the file system to execute a first target operation corresponding to a first target entity;
responsive at least to receiving the first request to execute the first target operation, executing, by the file system, a first logging operation comprising writing metadata to a first log entry of a first data structure stored in one or more persistent storage media;
determining, by the file system, that execution of the first logging operation is complete;
transmitting, from the file system to the application, a response to the first request that is based on completion of the first logging operation, the first logging operation being different than the first target operation requested by the first request;
wherein based on receipt of the response to the first request, the application executes an application operation prior to the file system completing execution of the first target operation;
subsequent to transmitting the response to the application:
accessing the first log entry;
executing the first target operation on the first target entity based at least in part on the first log entry,
wherein executing the first target operation (a) modifies a second data structure that corresponds to the first target entity and is stored in one or more transient storage media, and (b) results in generation of an updated second data structure;
persisting, to the one or more persistent storage media, data corresponding to the updated second data structure resulting from executing the first target operation.

* * * * *